(12) United States Patent
Verdian et al.

(10) Patent No.: US 11,842,335 B2
(45) Date of Patent: Dec. 12, 2023

(54) BLOCKCHAIN COMMUNICATIONS AND ORDERING

(71) Applicant: QUANT NETWORK LTD., London (GB)

(72) Inventors: Gilbert Verdian, London (GB); Colin Paterson, London (GB); Gaetano Mondelli, London (GB); Paolo Tasca, London (GB)

(73) Assignee: QUANT NETWORK LTD., London (GB)

( * ) Notice: Subject to any disclaimer, the term of this patent is extended or adjusted under 35 U.S.C. 154(b) by 674 days.

(21) Appl. No.: 16/768,097

(22) PCT Filed: Nov. 28, 2018

(86) PCT No.: PCT/EP2018/082832
§ 371 (c)(1),
(2) Date: May 29, 2020

(87) PCT Pub. No.: WO2019/106006
PCT Pub. Date: Jun. 6, 2019

(65) Prior Publication Data
US 2020/0311718 A1    Oct. 1, 2020

(30) Foreign Application Priority Data

Dec. 1, 2017   (EP) .................................... 17425121
Dec. 15, 2017  (IT) .......................... 102017000145294

(51) Int. Cl.
*G06Q 20/36*   (2012.01)
*G06Q 40/12*   (2023.01)
(Continued)

(52) U.S. Cl.
CPC .......... *G06Q 20/3674* (2013.01); *G06F 8/70* (2013.01); *G06F 16/2379* (2019.01);
(Continued)

(58) Field of Classification Search
None
See application file for complete search history.

(56) References Cited

U.S. PATENT DOCUMENTS 11,023,490 B2 *  6/2021  Madhavan ............. G06Q 40/06
11,474,994 B2 * 10/2022  Middleton ............. G06F 16/27
(Continued)

FOREIGN PATENT DOCUMENTS

WO   WO-2018090331 A1 *  5/2018   ......... G06Q 20/3821

OTHER PUBLICATIONS

V. L. Lemieux, "A typology of blockchain recordkeeping solutions and some reflections on their implications for the future of archival preservation," IEEE International Conference on Big Data (Big Data), 2017, pp. 2271-2278, doi: 10.1109/BigData.2017.8258180. (Year: 2017).*

(Continued)

*Primary Examiner* — Jacob C. Coppola
*Assistant Examiner* — Eduardo Castilho
(74) *Attorney, Agent, or Firm* — Rimon PC; Marc S. Kaufman

(57) ABSTRACT

The present disclosure provides a computer implemented method for maintaining a record of an order of messages appearing on one or more blockchains, the method comprising: identifying a plurality of messages, wherein each of the messages in the plurality of transactions is included on any of the one or more blockchains; and storing a record of the plurality of messages in a data store, wherein the record is indicative of the relative order of the plurality of transactions.

16 Claims, 12 Drawing Sheets

(51) Int. Cl.
    G06F 16/23    (2019.01)
    G06F 8/70    (2018.01)
    G06Q 20/38    (2012.01)
    G06Q 30/018    (2023.01)

(52) U.S. Cl.
    CPC ....... *G06Q 20/389* (2013.01); *G06Q 20/3827* (2013.01); *G06Q 20/3829* (2013.01); *G06Q 30/0185* (2013.01); *G06Q 40/12* (2013.12); *G06Q 2220/00* (2013.01)

(56) References Cited

U.S. PATENT DOCUMENTS

| | | | |
|---|---|---|---|
| 2016/0162897 A1 | 6/2016 | Feeney | |
| 2016/0342977 A1 | 11/2016 | Lam | |
| 2017/0364699 A1* | 12/2017 | Goldfarb | G06F 16/2282 |
| 2018/0089041 A1* | 3/2018 | Smith | G06Q 20/00 |
| 2018/0218003 A1* | 8/2018 | Banga | G06F 16/137 |
| 2018/0268151 A1* | 9/2018 | Cuomo | G06F 21/645 |
| 2018/0268401 A1* | 9/2018 | Ortiz | G06Q 20/326 |
| 2018/0294956 A1* | 10/2018 | O'Brien | G06F 11/1464 |
| 2018/0300382 A1* | 10/2018 | Madisetti | G06Q 20/389 |
| 2019/0042620 A1* | 2/2019 | Garagiola | G06Q 20/3827 |
| 2019/0123889 A1* | 4/2019 | Schmidt-Karaca | G06F 16/93 |
| 2019/0149633 A1* | 5/2019 | Evans | G06Q 30/0201 709/217 |
| 2019/0349733 A1* | 11/2019 | Nolan | G06F 16/1834 |
| 2020/0050595 A1* | 2/2020 | Sun | G06F 16/2379 |
| 2020/0074461 A1* | 3/2020 | DeRosa-Grund | G06Q 20/223 |
| 2020/0104293 A1* | 4/2020 | Shi | G06F 16/2365 |

OTHER PUBLICATIONS

"Anonymous, ""Blockchain Transaction Index Mechanism,"" An IP.com Prior Art Database Technical Disclosure, 2017, Authors et. al.: Disclosed Anonymously IP.com No. IPCOM000249524D IP.com Electronic Publication Date: Mar. 2, 2017 Retrieved from https://priorart.ip.com/IPCOM/000249524" (Year: 2017).*

H. Gupta, S. Mehta, S. Hans, B. Chatterjee, P. Lohia and R. C, "Provenance in Context of Hadoop as a Service (HaaS)—State of the Art and Research Directions," 2017 IEEE 10th International Conference on Cloud Computing (CLOUD), 2017, pp. 680-683, doi: 10.1109/CLOUD.2017.91. (Year: 2017).*

L. Yu, W. -T. Tsai, G. Li, Y. Yao, C. Hu and E. Deng, "Smart-Contract Execution with Concurrent Block Building," 2017 IEEE Symposium on Service-Oriented System Engineering (SOSE), San Francisco, CA, USA, 2017, pp. 160-167, doi: 10.1109/SOSE.2017.33. (Year: 2017).*

Antonopolous, Mastering Bitcoin, Published by O'Reilly Media, Inc., ISBN: 978-1-449-37404-4, chapters 2-4 (Year: 2014).*

Anonymous: "Whitepaper—Resources—Cosmos Network", Jan. 1, 2017 (Jan. 1, 2017), XP055648271, Retrieved from the Internet: URL:https://cosmos.network/resources/whitepaper.

Gavin Wood: "Polkadot: Vision for a Heterogeneous Multi-Chain Framework", Jul. 24, 2017 (Jul. 24, 2017), pp. 1-21, XP055597598, Retrieved from the Internet: URL:https://polkadot.network/PolkaDotPaper.pdf.

European Patent Office, Communication Pursuant to Article 94(3) EPC for European Application No. EP17425121.5 dated Sep. 11, 2020.

Augustana Digital Commons, et al., "Augustana College Data Insertion in Bitcoin's Blockchain Augustana Digital Commons Citation Data Insertion in Bitcoin's Blockchain." Script. 4. Transaction Malleability. 5. OP Return. 6. Coinbase. 7. Free Speech; Jul. 31, 2017. XP055464096; Retrieved from the Internet: URL:https://digitalcommons.augustana.edu/cgi/viewcontent.cgi?article=1000&context=cscfaculty [retrieved on Mar. 29, 2018].

Roman Matzutt, et al., "Poster: I don't want that content! On the risks of exploiting Bitcoin's blockchain as a content store", Computer and Communications Security, ACM, 2 Penn Plaza, Suite 701, New York, NY 10121-0701, USA; Oct. 24, 2016, pp. 1769-1771, XP058281374, DOI: 10.1145/2976749.2989059 ISBN: 978-1-4503-4139-4 Retrieved from the Internet: URL:https://www.martinhenze.de/wp-content/papercite-data/pdf/mhh+16.pdf [retrieved on Mar. 29, 2018].

Anonymous: "Whitepaper—Resources—Cosmos Network", Jan. 1, 2017 (Jan. 1, 2017), XP055648271, Retrieved from the Internet: URL:https://cosmos.network/resources/whitepaper [retrieved on Dec. 2, 2019].

Gavin Wood: "Polkadot: Vision for a Heterogeneous Multi-Chain Framework", Jul. 24, 2017 (Jul. 24, 217), pp. 1-21, XP055597598, Retrieved from the Internet: URL:https://polkadot. network/PolkaDotPaper.pdf [retrieved on Jun. 18, 2019].

Communication pursuant to Article 94(3) dated Jan. 3, 2022.

Roman Matzutt et al: "Poster: I don't want that content! On the risks of exploiting Bitcoin's blockchain as a content store", Computer and Communications Security, New York NY 10121-0701 USA, Oct. 24, 2016 (Oct. 24, 2016), pp. 1769-1771, XP058281374, DOI: 10.1145/2976749.2989059 ISBN: 978-1-4503-4139-4, Retrieved from the Internet: URL:https://www.martinhenze.de/wp-content/papercite-data/pdf/mhh+16.pdf [retrieved on Mar. 29, 2018].

Sward, A., Augustana Digital Commons et al, Data Insertion in Bitcoin's Blockchain, Jul. 31, 2017 (Jul. 31, 2017), XP055464096,Retrieved from the Internet: URL:https://digitalcommons.augustana.edu/c gi/viewcontent.cgi?article=1000&context=cs cfaculty [retrieved on Mar. 29, 2018], published in ledgerjournal.org ISSN 2379-5980 DOI 10.5915/LEDGER.2018.101.

* cited by examiner

BLOCKCHAIN COMMUNICATIONS AND ORDERING

TECHNICAL FIELD

This disclosure relates to methods, systems, computer programs and SDKs for maintaining a record of an order of transactions appearing on one or more blockchains. It also relates to methods, systems, computer programs and SDKs relating to blockchain communications.

BACKGROUND

Blockchain technologies have the potential for an enormous range of uses, offering a way in which data may be stored securely and reliably without the need for central data authentication authorities. Consequently, blockchain technologies may enable a whole host of technical benefits across a wide range of sectors, including, for example, improved data transparency, more robust data storage that is not reliant on one particular storage entity, improved data security and improved resistance to fraud, and has already found uses in such diverse sectors as electrical energy distribution and peer-to-peer cloud storage.

Blockchain was first conceptualised in 2009 in a white paper titled "Bitcoin: A Peer-to-Peer Electronic Cash System", published in the name of Satoshi Nakamoto. A copy of the white paper may be found at: https://bitcoin.org/bitcoin.pdf. The white paper proposed a peer-to-peer version of electronic cash called "Bitcoin" that utilised what has since been termed a blockchain to record peer-to-peer transfers of Bitcoin.

A blockchain is a de-centralised, distributed digital ledger, using which an effectively immutable record of data may be stored. They are de-centralised in that they do not necessarily require a central authority to add data to the blockchain or to maintain the integrity of the blockchain. Data may be added to a blockchain by an entity broadcasting a "transaction" to a network of nodes participating in the blockchain, wherein the transaction comprises the data to be added to the blockchain and cryptographic elements that conform with the blockchain protocol. Each of the nodes participating in the blockchain may then check the validity of the transaction and, if approved, add the transaction to a new block that they are working on.

Each of the nodes may also add to the new block that they are working on other new transactions that have been broadcast to the network of nodes. After a period of time, a node will publish their new block to the other nodes in the network, the new block including the various new transactions as well as cryptographic data that ties the new block to the preceding block in the blockchain. By cryptographically tying consecutive blocks together in this way, if one block in the blockchain is altered at any later time (for example, by someone wishing to fraudulently change the data stored in the blockchain), it may be easily detectable.

After a new block has been published by a node, the other nodes in the network may check the content of the new block and, if accepted, start work on their next new block, which will again be cryptographically tied to its preceding block. Thus, it can be seen that the blockchain will grow each time a new block is published and accepted, with each new accepted block being cryptographically tied to its preceding block. This process of nodes checking a published new block and accepting it into the blockchain is often referred to as a "consensus" mechanism.

In the white paper, "Bitcoin: A Peer-to-Peer Electronic Cash System", a particular protocol is proposed for Bitcoin. The protocol covers such things as the format and types of information that should be included in a transaction, the format and types of information to be included in new blocks, the cryptographic techniques and recipes that should be used for transactions and new blocks, and the particular type of consensus mechanism to be used (for example, in Bitcoin, the consensus mechanism utilises a hash-based proof-of-work in each block of the blockchain, which is also the cryptographic tie between each consecutive block). If a broadcast transaction does not properly conform to the protocol, it will not be included in any new blocks. Likewise, if a new block does not properly conform to the protocol, it will not be accepted onto the blockchain by the network of nodes.

Whilst blockchains, or distributed ledger technologies (DLTs) as they are also called, were first proposed to enable the cryptocurrency Bitcoin, they have subsequently found many other uses. At first, new cryptocurrencies were launched, such as Ethereum, Ripple and Namecoin, each operating on their own particular blockchains, utilising their own particular protocols. Since then, it has been recognised that blockchain technology may be exploited far more widely than cryptocurrencies and may be utilised in any scenario where an effectively immutable record of data is useful. This has led to a rapid expansion in the number of different blockchains currently in existence, each tailored to their own particular use case, and it is anticipated that the number of different blockchains will continue to increase as the technology gains further momentum and recognition.

SUMMARY

In a first aspect of the present disclosure, there is provided a computer implemented method for maintaining a record of an order of transactions appearing on one or more blockchains (DLTs), the method comprising identifying a plurality of transactions, wherein each of the transactions in the plurality of transactions is included on any of the one or more blockchains; and storing a record of the plurality of transactions in a data store, wherein the record is indicative of the relative order of the plurality of transactions.

By maintaining a record of an order of transactions, security and stability vulnerabilities associated with disordered messages may be mitigated, thereby improving the security and stability of systems utilising the one or more blockchains. This technical benefit is particularly apparent when the order of transactions appearing across two or more (a plurality) of blockchains is recorded, since ordering of transactions across multiple blockchains is particularly problematic and open to security and fraud issues.

Identifying the plurality of transactions may comprise reading the content of each new block added to each of the one or more blockchains.

Identifying the plurality of transactions may further comprise comparing the transactions in each new block against a relevance criterion, wherein the identified plurality of transactions comprise transactions that meet the relevance criterion. By comparing against the relevance criterion, only relevant transactions need be identified in the data store, which may improve the speed with which the data store may be reviewed in the future and reduce the size of data store required.

Preferably, storing the record of the plurality of transactions in the data store comprises, each time a transaction is identified in a new block, storing a record of that identified transaction in the data store, wherein the relative order of the plurality of transactions is the relative order in which each of the plurality of transactions was identified.

Preferably, the record of the plurality of transactions comprises a plurality of consecutive verification sets, wherein at least some of the plurality of consecutive verification sets comprise one or more transaction identifiers corresponding to a respective one or more of the plurality of transactions.

The method may further comprise storing, on at least one of the one or more blockchains, a record of the most recent verification set of the plurality of consecutive verification sets. In this way, integrity and non-repudiation of the record may be enhanced, thereby improving the security and stability of the method.

The method may further comprise checking that a record of the preceding verification set in the plurality of verification sets is present on the at least one of the one or more blockchains, and if a record of the preceding verification set is not present on the at least one of the one or more blockchains: replaying a record of the preceding verification set onto the at least one of the one or more blockchains. In this way, earlier forks in the blockchains may be quickly identified, whilst still maintaining the reliability of the recorded order of transactions.

The record of the preceding verification set may be replayed onto the at least one of the one or more blockchains before storing, on at least one of the one or more blockchains, the record of the most recent verification set.

The method may further comprise: if a record of the preceding verification set is not present on the at least one of the one or more blockchains: checking that each of the transactions identified in the preceding verification set is present on its corresponding blockchain of the one or more blockchains, and if one or more of the transactions identified in the preceding verification set are not present on their corresponding blockchains of the one or more blockchains: replaying the one or more transactions onto their corresponding blockchains.

The method may further comprise: checking that each of the transactions identified in the most recent verification set is present on the at least one of the one or more blockchains, and if one or more of the transactions identified in the preceding verification set are not present on their corresponding blockchains of the one or more blockchains: replaying the one or more transactions onto their corresponding blockchains.

The one or more transactions may be replayed onto their corresponding blockchains before storing, on at least one of the one or more blockchains, the record of the most recent verification set.

The record of the most recent verification set may comprise a verification set identifier that is determined based at least in part on the contents of the most recent verification set.

The verification set identifier of the most recent verification set may comprise a hash of the contents of the most recent verification set.

Storing the record of the most recent verification set may comprise broadcasting a transaction to at least one blockchain of the one or more blockchains for inclusion on the at least one blockchain, wherein the broadcast transaction comprises the unique identifier of the most recent verification set.

The record of the plurality of transactions may comprise a plurality of transaction identifiers that are each determined based at least in part on the contents of the respective transactions.

The plurality of transaction identifiers may comprise a plurality of hashes of the content of the plurality of transactions.

The record of the plurality of transactions may comprise the content of at least some of the plurality of transactions.

In a second aspect of the present disclosure, there is provided a system comprising: one or more processors; and a memory storing a software program, wherein the software program, when executed by the one or more processors, causes the one or more processors to perform a method according to any preceding claim.

In a third aspect of the present disclosure, there is provided one or more computer programs that, when executed by one or more processors, cause the one or more processors to carry out a method according to the first aspect.

In a fourth aspect of the present disclosure, there is provided a software development kit, SDK, comprising a set of software development tools for developing the one or more computer programs of the third aspect.

In a fifth aspect of the present disclosure, there is provided a method for providing interoperability between an application functional layer and a plurality of different blockchains, wherein the application functional layer comprises functional operations that make use of one or more of the plurality of different blockchains, the method comprising a blockchain communications layer: receiving a blockchain request from the application functional layer, wherein the blockchain request relates to a blockchain operation to be performed on one or more blockchains of the plurality of different blockchains; and interfacing with the one or more blockchains in accordance with protocols of the one or more blockchains to perform the blockchain operation. Thus, the application functional layer may be decoupled from the blockchain protocols, enabling applications to operate across, and switch between, blockchains more straightforwardly, thereby enabling any security or stability threats in particular blockchains to be mitigated more quickly.

The blockchain request may comprise a request to read data on the one or more blockchains. The request to read data from the one or more blockchains may comprise a data identifier indicative of the data to be read from the one or more blockchains.

Interfacing with the one or more blockchains may comprise reading the requested data on the one or more blockchains, and wherein the method further comprises the blockchain communications layer: communicating, to the application functional layer, the data read from the one or more blockchains.

The blockchain request may comprise a request to write data to the one or more blockchains.

The request to write data may comprise the data to be written to the one or more blockchains.

The blockchain request may comprise a request to perform a cross ledger transaction, XLT, between a first blockchain of the plurality of blockchains and a second blockchain of the plurality of blockchains, and wherein the request to perform the XLT comprises an XLT data identifier indicative of the data on the first blockchain to be transferred to the second blockchain by the XLT.

Communications between the blockchain communications layer and the application functional layer may be carried out in accordance with methods defined by a blockchain programming interface, BPI.

In a sixth aspect of the present disclosure, there is provided a system comprising: one or more processors; and a memory storing a software program, wherein the software program, when executed by the one or more processors, causes the one or more processors to perform a method according to any preceding claim.

In a seventh aspect of the present disclosure, there is provided one or more computer programs that, when executed by one or more processors, cause the one or more processors to carry out a method according to the fifth aspect.

In an eighth aspect of the present disclosure, there is provided a software development kit, SDK, comprising a set of software development tools for developing the one or more computer programs of the seventh aspect.

In a ninth aspect of the present disclosure, there is provided a method for performing a cross ledger transaction, XLT, between a first blockchain and a second blockchain, the method comprising: identifying, on the first blockchain, a propose XLT transaction relating to an XLT; storing, in a transaction record in a data store, a record of the propose XLT transaction; identifying, on the second blockchain, a ready XLT transaction; storing, in the transaction record in the data store, a record of the ready XLT transaction, wherein the record is indicative of the relative order of the propose XLT transaction and the ready XLT transaction; determining whether or not the propose XLT transaction and the ready XLT transaction meet an XLT criteria; and if the propose XLT transaction and the ready XLT transaction meet the XLT criteria, broadcasting a commit XLT transaction to the first blockchain and the second blockchain to execute the XLT between the first blockchain and the second blockchain, wherein the XLT criteria comprise a first criterion that the ready XLT transaction corresponds to the propose XLT transaction and a second criterion that the transaction record is indicative of the propose XLT transaction preceding the ready XLT transaction. An order of transactions across two or more blockchains may therefore be reliably maintained and understood, even in the event of forks on one or more of the blockchains, thereby improving the security and reliability, and reducing the risk of fraud, in cross-ledger transactions.

The method may further comprise: broadcasting one or more transactions to the first blockchain and/or the second blockchain, wherein the one or more transactions comprise a respective one or more record identifiers, and wherein each record identifier is determined based at least in part on at least part of the content of the transaction record, and wherein the one or more record identifiers are together indicative of the record of the propose XLT transaction and the ready XLT transaction.

The one or more record identifiers may comprise one or more hashes of at least part of the content of the transaction record.

The XLT criteria may comprise a third criterion that the one or more transactions are included on the first blockchain and/or the second blockchain, such that the one or more record identifiers are stored on the first blockchain and/or second blockchain.

The record of the propose XLT transaction may comprise a hash of the content of the propose XLT transaction and the record of the ready XLT transaction comprises a hash of the content of the ready XLT transaction.

In a tenth aspect of the present disclosure, there is provided a system comprising: one or more processors; and a memory storing a software program, wherein the software program, when executed by the one or more processors, causes the one or more processors to perform a method according to the ninth aspect.

In an eleventh aspect of the present disclosure, there is provided one or more computer programs that, when executed by one or more processors, cause the one or more processors to carry out a method according to the ninth aspect.

In a twelfth aspect of the present disclosure, there is provided a software development kit, SDK, comprising a set of software development tools for developing the one or more computer programs of the eleventh aspect.

In a thirteenth aspect of the present disclosure, there is provided a method for maintaining a record of a relative order of transactions carried out on two or more blockchains. In this way, the order of transactions on different blockchains may be reliably ordered, thereby enabling improvements in security and reliability, particularly in the event of blockchain forks and/or XLTs.

In a fourteenth aspect of the present disclosure, there is provided a system comprising: one or more processors; and a memory storing a software program, wherein the software program, when executed by the one or more processors, causes the one or more processors to perform a method according to the ninth aspect.

In a fifteenth aspect of the present disclosure, there is provided one or more computer programs that, when executed by one or more processors, cause the one or more processors to carry out a method according to the ninth aspect.

In a sixteenth aspect of the present disclosure, there is provided a software development kit, SDK, comprising a set of software development tools for developing the one or more computer programs of the eleventh aspect.

DRAWINGS

Aspects of the disclosure are described, by way of example only, with reference to the following drawings, in which.

DETAILED DESCRIPTION

Figure 1:
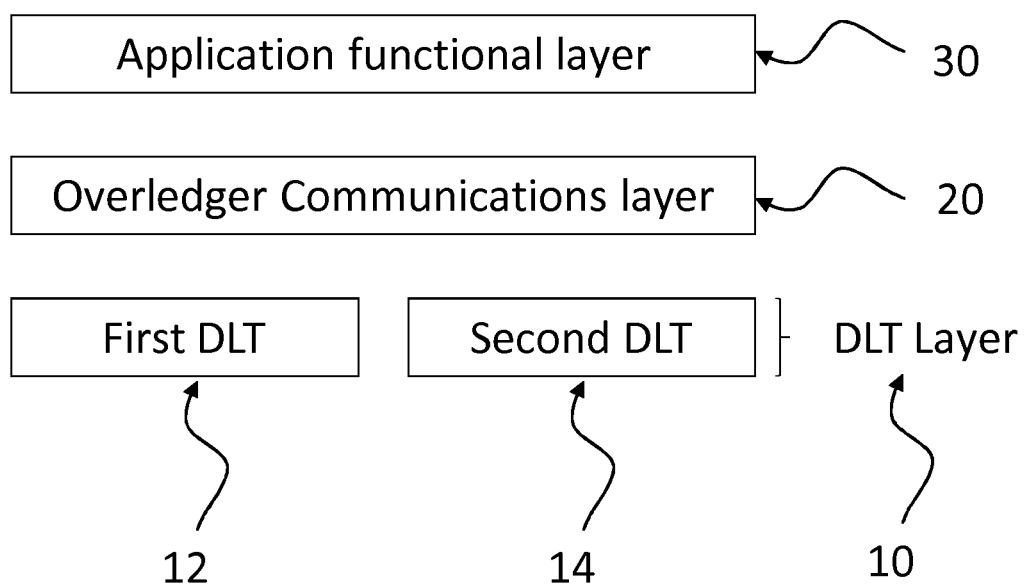
FIG. 1 shows an example representation of an overledger communication layer in accordance with an aspect of the present disclosure.

The inventors have recognised that as blockchain technology grows and develops, it may become increasingly difficult for different entities to securely, safely and reliably make use of it. For example, currently, if an entity wishes to develop a new software application that uses blockchain technology, they must either start their own, new blockchain (which is extremely time consuming and complex, requiring the establishment of an entirely new blockchain protocol) or utilise an existing blockchain technology, such as Bitcoin or Ethereum.

It has been realised by the inventors that in order to make use of an existing blockchain technology, an entity must develop their software application to be fully compliant with the protocol for that blockchain, for example using the cryptographic techniques, transaction format and communication channels dictated by the protocol. Therefore, the selection of which blockchain technology to use is a decision that needs to be made very early in the software development process, potentially before the requirements and uses of the software application are fully understood.

Each blockchain has a particular protocol that was formulated to meet the particular needs of the blockchain. Blockchain protocols cannot be changed without causing a hard fork in the blockchain, which means that blockchains are not very adaptive to changes in need. Consequently, if the entity should later decide that their chosen blockchain technology no longer meets their needs (for example, because the chosen blockchain technology has become unstable or insecure, or because the requirements of the software application have changed in such a way that a different blockchain technology would be favourable, or because newer blockchains are superior to the originally chosen, but now outdated, blockchain technology), in order to start using an alternative blockchain technology they must modify their software to conform with the protocol of the alternative blockchain technology. In practice, this may be very difficult, if not impossible, since the software will be built on the foundations set out by the protocol of the originally chosen blockchain technology. Consequently, choosing the correct blockchain technology from the start may be very important, but may in practice be very difficult to achieve due to the rapidly developing nature of blockchain technology.

Furthermore, any data that has previously been stored on a blockchain may not be straightforwardly transferred across to an alternative blockchain, owing to differences between blockchain protocols.

In view of these long-term difficulties that have been recognised by the inventors, a technical solution of introducing a new communications layer to separate the functionality of applications from the blockchains that they are utilising has been devised by the inventors and is provided in the present disclosure. By decoupling the application functionality from the various requirements of the blockchain(s) on which the application is operating, inter-operability between applications and blockchains may be improved. As will be appreciated from the aspects of the disclosure described in more detail in the following, this may mean that changes in blockchain technology in the future may be more efficiently and flexibly responded to. This may help in responding to security threats (for example, if one blockchain technology is recognised as having a security flaw, applications may more straightforwardly switch to a more secure blockchain technology), improving security and reliability (because applications may more easily operate across multiple blockchains, storing duplicate data across the blockchains and/or transferring data between blockchains) and/or improving efficiency and speed (for example, where a newer blockchain technology has increased processing speeds for transactions, applications may more straightforwardly switch to that newer blockchain technology).

Throughout the following disclosure, the terms 'blockchain', 'blockchain technology' and 'distributed ledger technology (DLT)' are used interchangeably. Furthermore, throughout the following disclosure, the term 'transaction' is used in relation to blockchains. The person skilled in the art will appreciate that a 'transaction' in this context is not limited to a transfer of ownership of something, for example currency. Instead, a 'transaction' is the means by which some form of information may be put on a blockchain. For example, an entity may broadcast a 'transaction' to be put on a blockchain, the transaction comprising the information to be put on the blockchain as well as any other data items (such as public keys, a signature, a hash, etc) that are required in order for the transaction to be accepted onto the blockchain. The information to be put onto the blockchain may relate to a financial transfer of currency, but may alternatively be any other sort of information (for example a piece of data that an entity wishes to store on a blockchain for their own reference later).

FIG. 1 shows an example visualisation of the introduction of an 'overledger communications layer' 20, located between an application functional layer 30 and a DLT layer 10. The terminology 'overledger communications layer' is utilised throughout this disclosure to mean a communications layer that decouples the protocol requirements of the DLTs from the functional operations of the applications that utilise the DLTs (sometimes referred to as 'business logic').

In FIG. 1, two DLTs—a first DLT 12 and a second DLT 14—are represented as being part of the DLT layer 10, although it will be appreciated that the overledger communications layer 20 may be capable of interfacing with any number of different DLTs, for example Bitcoin, Ethereum, Corda, Openchain, Hyperledger, etc. Each DLT will have its own particular protocol for blockchain operations, such as reading data from a blockchain, writing data to a blockchain and/or transferring ownership of data from one entity to another entity on the same blockchain, or to a different blockchain (a cross-ledger transaction) (different blockchains may allow any one or more of read, write and transfer operations to be performed on the blockchain, depending on the purpose that the blockchain has been configured to perform).

The overledger communications layer 20 comprises the different methods by which the blockchain operations may be performed on the first DLT 12 and the second DLT 14. For example, the first DLT 12 may be Bitcoin, which has a particular protocol for new transactions to be written to its blockchain. The particular protocol of Bitcoin will be well understood by the skilled person, but briefly it may comprise such information as the public key of the payee (the 'wallet' of the payee), an amount to be transferred to the payee, a hash of the earlier transaction by which the payer obtained the bitcoin now being transferred and a signature of the payer (signed using the payer's private key). The protocol defines the allowable format of each of these items (such as the length and/or object type), the cryptographic techniques that must be used to generate the hash and the signature (for example, SHA-256), and the order in which each item is to appear within the transaction. The protocol may also define how information may be read from the bitcoin blockchain, for example identifying what information is kept in each transaction and in each block on the blockchain, the format and order of the information, and the cryptographic techniques used to generate the hashes, signatures and proofs of work (so that each may be verified when reading the blockchain). In contrast, the second DLT 14 may have an entirely different protocol that allows different blockchain operations, such as only read operations, to be performed (for example, because it is a closed blockchain that anyone may read, but only authorised entities may write to), and each block may comprise different information, in a different order and/or use different cryptographic techniques to the first DLT 12. The overledger communications layer 20 will comprise the methods that enable the various allowable operations to be performed on each of the first DLT 12 and second DLT 14.

The application functional layer 30 represented in FIG. 1 comprises the functional operations (sometimes referred to as 'business logic') of an application(s) that is utilising one or more of the DLTs. When the application functional layer 30 of an application wishes to perform a blockchain operation, it passes the relevant information (a blockchain request) to the overledger communications layer 20 (for example, comprising the data that it wishes to write to a DLT, or the nature of the information that it wishes to read from the DLT), which then interfaces with the relevant DLT(s) in accordance with the protocols of relevant DLT(s) in order to perform the blockchain operation. The overledger communications layer 20 may then return any relevant results to the application functional layer 30. This operation may be appreciated more fully from the more specific examples described later in the present disclosure.

So that various different entities may make use of the methods held in the overledger communications layer 20, the methods may be, for example, encapsulated in a software development kit (SDK), which we shall refer to from here on as the overledger SDK. It will be appreciated that the methods held in the overledger communications layer 20 may be encapsulated in any other suitable, equivalent way. By obtaining the overledger SDK, a developer may more straightforwardly select which DLT(s) they wish to utilise for the particular software application that they are developing and have the methods and tools required to interact with their selected DLT(s) provided to them by the overledger SDK.

Figure 2:
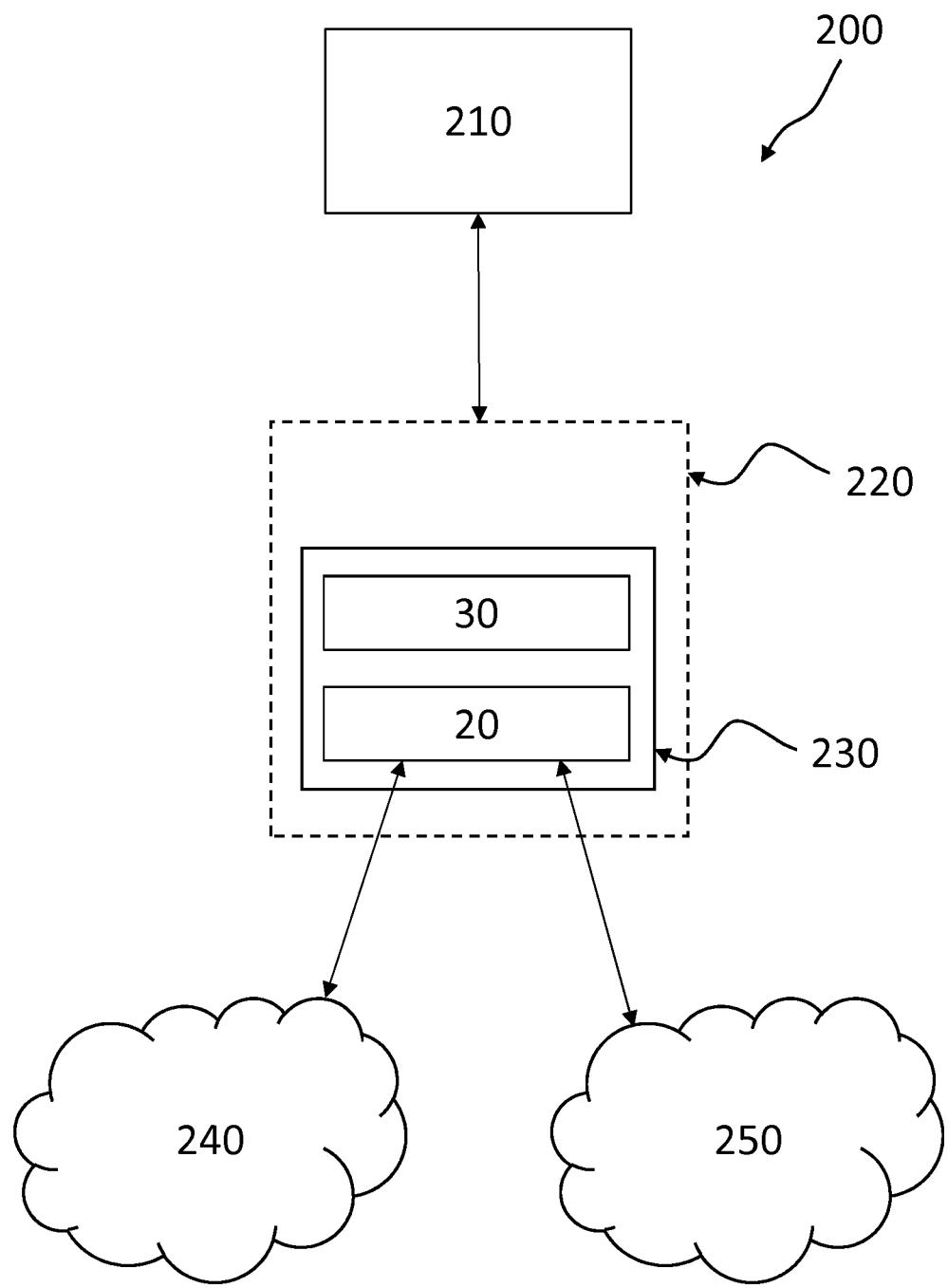
FIG. 2 shows an example representation of a system utilising the overledger communication layer of FIG. 1.

FIG. 2 shows an example representation of a system 200 comprising an SDK provider 210, an application developer 220, a developed application 230, a first DLT network 240 and a second DLT network 250. The SDK provider 210 may be responsible for building and maintaining the overledger SDK, which in this example comprises the methods for interfacing (interacting) with at least the first DLT 12 and the second DLT 14, although it may comprise methods of interaction for any number of DLTs (i.e., for a plurality of DLTs). When the application developer 220 wishes to develop an application that utilises the first DLT 12 and/or the second DLT 14, they may obtain the overledger SDK from the SDK provider 210 (for example, by downloading it from the SDK provider 210, or from any other overledger SDK hosting entity). They may then utilise the overledger SDK to develop the application 230, which can then interact with the first DLT 12 and/or second DLT 14 in accordance with the methods defined in the overledger SDK. In FIG. 2, the first DLT network 240 represents the network of participating nodes for the first DLT 12 and the second DLT network 250 represents the network of participating nodes for the second DLT 14. In the particular example represented in FIG. 2, the application 230 is shown to be capable of interacting with both the first DLT network 240 and the second DLT network 250, although it will be appreciated that the application developer may alternatively utilise the overledger SDK to configure the application 230 to interact with only the first DLT network 240 or only the second DLT network 250.

In one particular aspect, as part of the development of the application 230, the application developer 230 may develop a programming interface to handle communications between the overledger communications layer 20 and the application functional layer 30 of the application 230. From hereon we shall refer to this interface as the Blockchain Programming Interface (BPI), which is configured to help simplify the interaction of the application functional layer 30 and the overledger communications layer 20. For example, the overledger communications layer 20 of the application 230 may operate in accordance with the methods defined in the overledger SDK in order to handle the communications to and from the first DLT network 240 and/or the second DLT network 250. The application developer 220 may develop the BPI to define the particular types of information that the application functional layer 30 of the application 230 may pass to the overledger communication layer 20 in a blockchain request relating to a blockchain operation to be performed on one or more block and/or the particular types of information that it may receive from the overledger communications layer 20. For example, it may offer a 'write to first DLT 12' command, which may specify any relevant parameters for data to be written to the first DLT 12 (such as maximum length, object type, etc) and/or a 'read from second DLT 14' command, which may specify any relevant data that is needed in order to read information from the second DLT 14 (for example, if it is desired to read data on the second DLT 14 that has been written onto the second DLT 14 by a particular entity, the 'read from second DLT 14' command may specify that it needs the blockchain identifier of the particular entity, such as their public key, using which the overledger communications layer 20 may search the contents of the second DLT 14 for transactions that include that blockchain identifier). Consequently, it can be seen that the application functional layer 30 of the application 230 may utilise the various commands offered by the BPI so that the overledger communications layer 20 can interface with any of the DLTs that are supported by the overledger SDK.

Thus, the application functional layer 30 of the application 230 is decoupled from the specific DLT layer 10 protocol requirements of the first DLT 12 and the second DLT 14 by virtue of the overledger communications layer 20 that operates in accordance with the overledger SDK. The application functional layer 30 need only send and receive data to the overledger communications layer 20 in the way defined by the BPI in order to interact with the first DLT 12 and/or the second DLT 14. Consequently, if either the first DLT 12 or second DLT 14 should change their protocols in the future, this may be handled by the overledger communications layer 20 by virtue of changes to the overledger SDK. The application functional layer 30 of the application 230 may remain unchanged, since it will still send data to, and receive data from, the overledger communications layer 20 as defined in the BPI, or at most minimally changed if the DLT protocol change is such that the BPI must be changed in some way (for example, if the object type that can be written to a DLT is changed, then the BPI may also change which may require the application functional layer 30 to provide data of a different object type). Nevertheless, it is clear that even in the case where a change may be required to the application functional layer 30, it will be a minimal change, and that the core aspects of the application functional layer 30 may remain unchanged.

Likewise, the same can be seen if a decision is made by the application developer 220 to start using a different DLT (for example, because the originally chosen DLT is now unstable or has security flaws, or because a new DLT has been launched which has improved speeds and/or efficiency). If that different DLT is supported by the overledger SDK, the application developer 220 may simply update the BPI to offer commands for interacting with that different DLT, which the application functional layer 30 of the application 230 may then utilise. Again, it can be seen that changes required to the application functional layer 30 of the application 230 may be only minimal or nil, since the application functional layer 30 will not have been developed in order to interact with one particular DLT and the specific protocol that that DLT requires—it is instead developed to perform the functional requirements of the application and utilise the BPI whenever some form of blockchain interaction is required.

The benefits of decoupling the application functional layer 30 from the DLT layer 10 using the overledger communications layer 20 may be even further appreciated by considering a scenario whereby the application developer 220 develops a service offering for other 'client' application developers to utilise. The service offering may relate to any type of blockchain service that other application developers may wish to utilise, for example a service enabling the writing of particular types of information to blockchains (which is described in more detail later in the section 'messaging aspect') and/or a service enabling cross ledger transactions (which is described in more detail later in the section 'cross ledger transaction aspect') and/or a service enabling reading of particular types of information from DLTs, etc.

Figure 3:
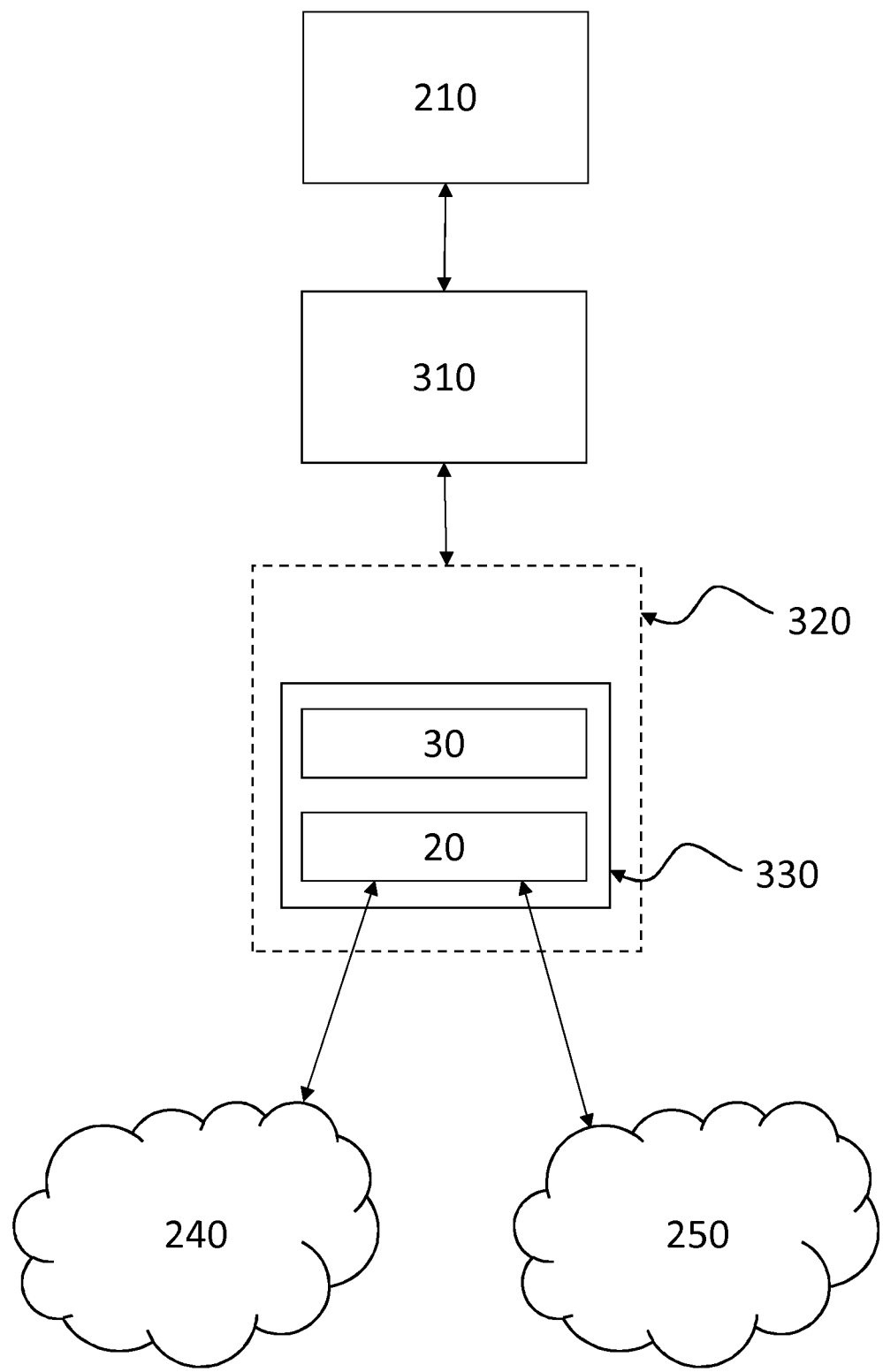
FIG. 3 shows an example representation of a further system utilising the overledger communication layer of FIG. 1.

FIG. 3 shows an example system 300 to demonstrate a service offering that may be utilised by 'client' application developers. The system 300 comprises the SDK provider 210 (described earlier), a service offering developer 310, a client application developer 320, a client application 330, the first DLT network 240 (described earlier) and the second DLT network 250 (described earlier).

Figure 4:
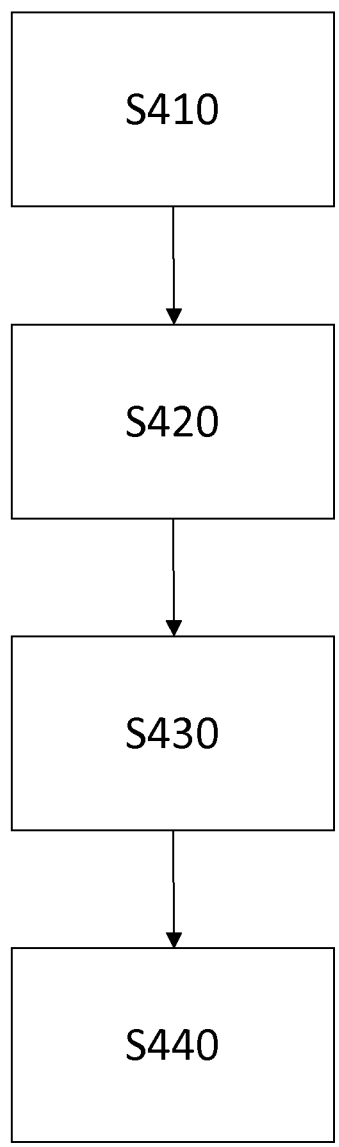
FIG. 4 shows a representation of steps of an example method performed using the system of FIG. 3.

FIG. 4 shows example method steps exemplifying how the service offering developer may utilise the overledger SDK.

In Step S410, the service offering developer 310 may obtain the overledger SDK from the SDK provider 210 (for example, by downloading it from the SDK provider 210, or from any other overledger SDK hosting entity).

In Step S420, the service offering developer 310 may develop a BPI for the service that they are offering and encapsulate it appropriately (for example, in a BPI config file, although any other suitable alternative may be used instead). The BPI will specify functions, commands, etc, that may be used by an application functional layer 30 of the client application 330 for interacting with one or more DLTs, as explained earlier.

In Step S430, the client application developer 320 may obtain the overledger SDK and the BPI config file (for example by downloading them from the service offering developer 310, or from any other suitable hosting entity).

In Step S440, the client application developer 320 develops the application functional layer 30 of their client application 330. Where the application functional layer 30 needs to interact with a DLT in any way, the application functional layer 30 may simply utilise a command or function in the BPI appropriately in order to communicate a blockchain request to the overledger communications layer 20, the blockchain request relating to a blockchain operation to be performed on one or more blockchains. Thus, it can be seen that the overledger SDK and the BPI provided by the service offering developer 310 decouple the application functional layer 30 from the DLT layer 10. The overledger SDK may therefore be viewed as performing the function of the overledger communications layer 20 and the BPI defining how the application functional layer 30 may interface with the overledger communications layer 20 in order to carry out the particular services that are offered by the service offering developer.

Consequently, if the client application developer 320 decides at a later date that they wish to change the DLT that they use for the client application 320 (for example, initially the functional application layer 30 of the client application 330 may have been configured to use BPI functions and commands to interact with the first DLT 22, but later it is decided that the second DLT 24 should be used instead), they merely need to change the particular BPI functions and commands that the functional application layer 20 uses (assuming the overledger SDK and BPI support both the first DLT 22 and the second DLT 24). Likewise, if something were to change about the protocols of any of the DLTs supported by the overledger SDK, the overledger SDK may be changed and the service offering developer 310 may consequently change the BPI, if necessary. As a result, at most the client application developer should only need to change the particular BPI functions and commands that the functional application layer 30 of the client application 330 uses, rather than having to change any of the core aspects of the functional application layer 30 of the client application.

Optionally, after the service offering developer 310 has created the BPI config file, they may sign it using standard public-private key encryption techniques, so that the client application developer 320 may verify that the BPI config file they obtain is valid.

The overledger SDK may include a number of different features that enable particular types of DLT interactions to take place. Two of these particular features—the 'messaging aspect' and the 'cross ledger transaction' aspect—are described in more detail below.

It will be appreciated that whilst application functional layer 30 and the overledger communications layer 20 are both described above as 'layers', they may alternatively be seen as software modules or packages. For example, they may be two modules within the application 230 or the client application 330. Alternatively, they may each be located within different applications, potentially operating on different electronic devices. For example, the application functional layer 30 may be a software module or package operating on a client electronic device, and the overledger communications layer 20 may be a different software module or package operating on a service offering electronic device, wherein the two layers communicate in accordance with the BPI via any suitable communications interface. Furthermore, the overledger communications layer 20 may be seen as a software module or package configured to enable particular blockchain operations to be performed on any one or more different DLTs, wherein the service offering developer 310 allows client application developers either to download the overledger communication layer 20 and make use of it via the BPI, or utilise it remotely via the BPI.

Messaging Aspect

It has been recognised by the inventors that it may often be useful to maintain on a blockchain an immutable record of information that the blockchain is not necessarily designed to store. Throughout the following, the term 'message' is used, but it should be understood that 'message' encompasses any type of information for which there is a desire to keep a record using a blockchain.

By keeping a record of a message using a blockchain, an effectively immutable record of the message may be kept, such that the content of the message may be verified in the future. Blockchains are equipped to accept some types of information within transactions that are included in each block, but are usually very prescriptive as to what that information may be. For example, a number of popular blockchains (such as Bitcoin) were originally designed for cryptocurrencies and simple financial transfers. Other blockchains have been developed for other specific purposes, and it is likely that in the future more blockchains still will be developed for even further specific purposes. In the course of developing the overledger communications layer 20, the inventors realised that it may be very useful to be able to store some types on information on blockchains that were not designed for that purpose. One particular example use is as part of maintaining a record of an order of transactions appearing on one or more blockchains as described later, although there are many other potential uses and benefits.

Having realised the potential benefits of storing messages on blockchains that were not designed for that purpose, the inventors investigated the details of transactions within existing blockchain architectures. It was realised that a number of blockchain architectures include a field within transactions, into which non-essential data may be added. For example, Bitcoin has an 'OP-RETURN' field, Ethereum has a field that is used for script bytecode and Ripple has a 'memos' field. These fields may generally be referred to as 'non-essential data fields'. However, each of these fields is relatively limited in size and, therefore, usefulness.

The solution identified by the inventors is to use such fields to store a value that is based at least in part on, and is uniquely indicative of, a message (such as a hash or encryption of the message) and then store the message elsewhere (off-chain). The value that is uniquely indicative the message may act as a pointer (for example, a hash pointer) to the complete message that is stored off-chain. By storing a value on the blockchain that is uniquely indicative of the message, the integrity of the message stored off-chain may be checked at any time by simply generating a test value based on the off-chain stored message and checking it against the value stored on the blockchain. Because the test value is generated in the same way as the value stored on the blockchain (for example, using the same hash recipe), if the test value matches the value stored on the blockchain, then the message stored off-chain has integrity (i.e., has not been altered). If they do not match, then the off-chain stored message has been tampered with in some way. This is because the contents of the blockchain are effectively immutable, so the value stored on the blockchain cannot be altered in any way.

The skilled person will appreciate that the value that is uniquely indicative of the message may be generated in any suitable way. For example, it may be generated by hashing the content of the message using a hashing algorithm such as SHA-2 (for example, SHA-256, SHA-512, etc) or SHA-3, such that the value uniquely indicative of the message is a hash, which acts as a hash-pointer in the blockchain. Alternatively, it may be generated by encrypting the content of the message using any suitable encryption algorithm. The particular way in which the value that is uniquely indicative of the message may be generated may be chosen based on the requirements of the particular blockchain on which it is to be stored and/or any particular cryptographic requirements that need to be met (for example, level of integrity offered by the algorithm, etc). For example, the transaction field within which the value is to be stored may have a particular maximum length which precludes certain hashing algorithms since the hashes they produce may be too long. The overledger SDK may include the particular hashing and/or encryption algorithm(s) that is appropriate for the DLTs that it supports, such that an application functional layer may simply pass the message to the overledger communications layer 20, which may then deal with it appropriately in order to store a record of the message on a DLT. The application may then store a copy of the message elsewhere off-chain (for example, in local memory on the device on which the application is operating, or in remote memory such as a remote database or cloud storage, etc).

As mentioned earlier, there may be many potential uses for the above described messaging aspect. One particular, non-limiting, example use case is described below with reference to FIG. 5.

Figure 5:
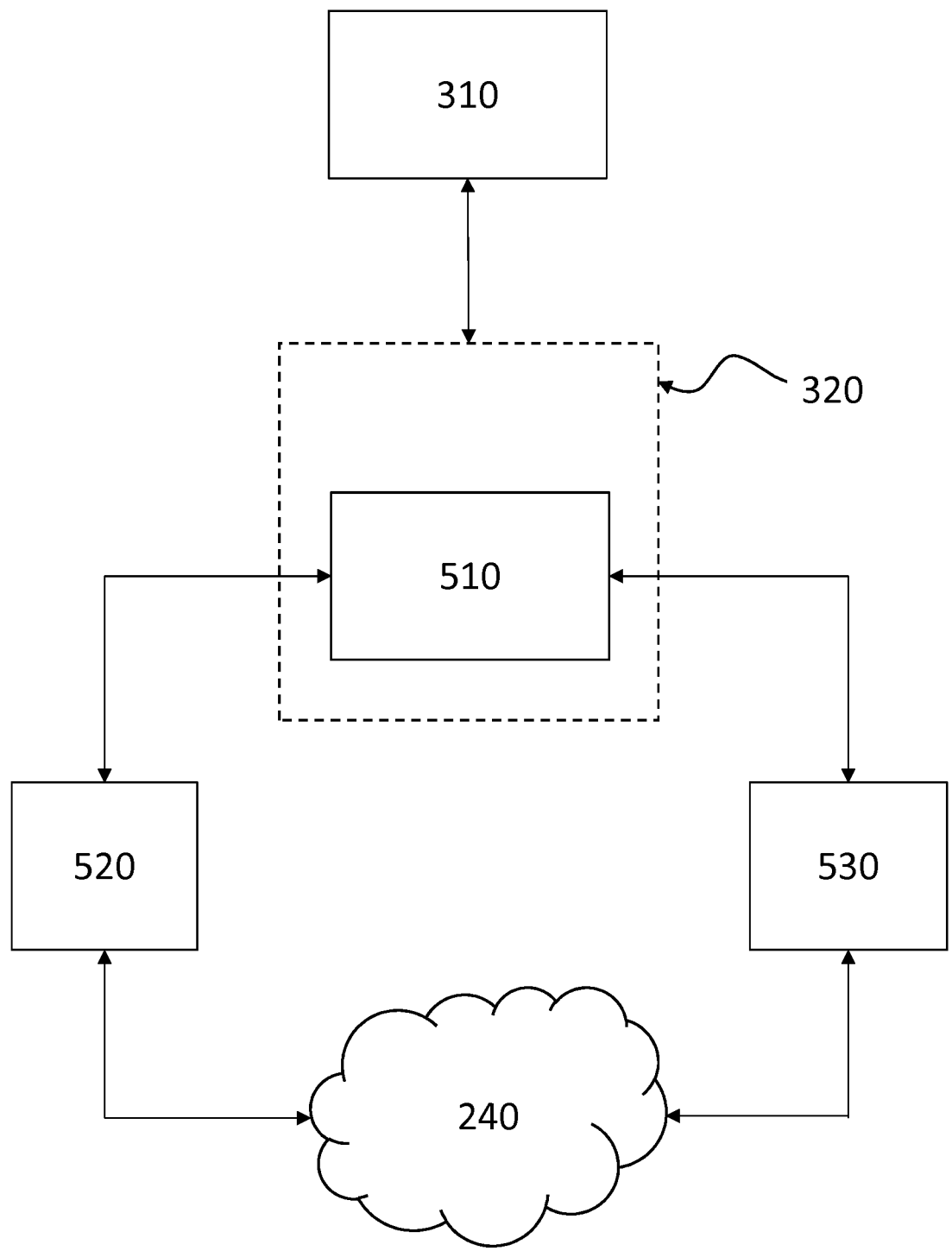
FIG. 5 shows an example representation of a further system utilising the overledger communication layer of FIG. 1.

FIG. 5 shows a system 500 comprising the service offering developer 310, the client application developer 320, a client application back-end 510, a first client application 520, a second client application 530 and the first DLT network 240. The service offering developer 310 may create a BPI for a messaging service that offers BPI functions for recording messages on one or more DLTs using the messaging aspect described above. The client application developer 320 may then use the overledger SDK and the BPI config file of the service offering developer 310 to develop a messaging application that enables users of the messaging application to securely send messages to each other. The first client application 520 and the second client application 530 may be duplicate client applications that operate on electronic devices of the first and second user respectively, for example on mobile electronic devices (such as smart phones, or tablet computers, or laptop computers) or on desktop computers. The first client application 520 and the second client application 530 may operate on the electronic devices of the first and second user as software installations on the devices, or as a web-browser based application, etc.

If the first user wishes to communicate a message to the second user, they may enter the message and an identification of the second user (the identification may take any suitable form, for example a user name of the second user of the client application) into the first client application 520. The functional application layer 30 of the client application may be configured to pass the message to the overledger communications layer 20 of the first client application 520 for adding to the first DLT 12 using the appropriate function/command in the BPI produced by the service offering developer 310. The overledger communications layer 20 may then hash the message in accordance with the SDK methods for interacting with the first DLT 12, construct an appropriate transaction for the first DLT 12 comprising the hash of the message and communicate the transaction to the first DLT network 240. The hash of the message will thus be included on the first DLT 12. The overledger communications layer 20 of the first client application 520 may optionally also be configured to return a notification to the application functional layer 30 when it has determined that the transaction has successfully been added to the first DLT 12. A copy of the entire message and the hash of the message may also be communicated to the client application back-end 510 (which may be, for example, a server, or database, or cloud-based storage system offered by the client application developer 320 to receive, store and retrieve messages), for example by the application functional layer 30 receiving the hash of the message from the overledger communications layer 20 and then communicating it to the client application back-end 510 along with the message. The communication between the first client application 520 and the client application back-end 510 may optionally be secured using any appropriate cryptographic technique.

The second user may then become aware that a message is waiting for them. There are many different ways in which this may happen, for example the second user identifier may have been the second user's DLT public key, or DLT wallet, or may have been used by the first client application 520 to obtain the second user's DLT public key, or DLT wallet, and the transaction on DLT 12 may identify the second user's public key, or DLT wallet, as the recipient of the transaction. In this case, the second client application 530 may notice that a new transaction on the first DLT 12 identifies the second user (if the second client application 530 is configured to monitor the contents of each new block added to the first DLT 12 to look for any new transactions identifying the second user DLT public key, or DLT wallet). Alternatively, a third party service may perform this monitoring process and notify the second client application 530. The application functional layer 30 of the second client application 530 may then obtain the hash of the message from the first DLT 12 using an appropriate BPI 'read' function.

Once the second client application 530 has a copy of the message hash, the application functional layer 30 may communicate it to the client application back-end 510 along with some form of authentication in order to authenticate the second user to the client application back-end 510 (for example, using any form of authentication process that the second client application 530 and the client application back-end 510 have established, or by providing a digital signature signed by the second user's DLT private key, which the client application back-end 510 can check using the public key associated with the message hash stored on the first DLT 240). If authentication is passed, the full message corresponding to the message hash may then be returned to the second client application 530. The second client application 530 may then verify the integrity of the returned message by passing it through the same hashing algorithm as was used by the first client application 520 (for example, by using an appropriate 'check message' BPI function, or in any other way seen fit by the service offering provider 310 and/or client application developer 320) to create a test hash and then comparing the test hash to the message hash retrieved from the first DLT 12.

A number of benefits of this particular example process may be immediately apparent. First, the contents of the message may be securely passed from the first user to the second user, without them having to perform complex and often difficult to reliably implement techniques such as encrypted emails, or password protected documents that require a password to be agreed between the two users. Furthermore, the second user 530 may be sure that the client application back-end 510 has not tampered with the message in any way, since otherwise the test hash would not match the message hash stored on the first DLT 12. Furthermore, if at any time in the future there is some form of dispute between the first and second users regarding the content of the message, the message hash stored on the first DLT 12 may be used to resolve the dispute absolutely.

The second user may likewise reply to the message in an analogous way.

It will be appreciated that this is merely one particular example use case for the messaging aspect of the present disclosure and that many others may be possible. Furthermore, many alternative implementations of the particular use case described above are possible. For example, the application back-end may alternatively be provided by the service offering developer 310 and the BPI may be configured simply to receive the message and the overledger commutations layer 20 take care of putting the message hash onto the first DLT 12 and also communicating the message and the message hash to the application back-end 510. In this case, the application functional layer 30 of the client application might merely be concerned only with other functions, such as the GUI and other functionality provided by the client application. Furthermore, the application functional layer 30 may utilise functions or commands offered by the BPI to put the message hash on not just one, but many, DLTs, thereby offering further redundancy and backup for the message hash.

Transaction Ordering Aspect

An important requirement of reliable blockchain operations is transaction ordering. For example, it has previously been recognised that in order to prevent double spend cryptocurrency fraud, when a new transaction is broadcast to a blockchain network, it must be possible to determine whether or not the cryptocurrency identified in that new transaction has been previously spent and only include the new transaction in a new block if it has not been previously spent (i.e., prevent double spending). A number of existing blockchains achieve this by virtue of the chronological nature of blocks on the blockchain, each block including within it a time stamp, and checking in the existing blocks that the cryptocurrency identified in the new transaction has not already been spent.

However, the inventors have recognised that the reliable ordering of transactions may be important not only in cryptocurrency blockchains, but more generally for all types of blockchains. For example, it will be appreciated that in various internet and telecommunications fields and protocols, incorrectly ordered messaging may be exploited as a security and stability vulnerably. For example, there are numerous ways in which the ordering and synchronisation of TCP/IP packets can affect the security of a system, such as messages falling out of the correct order or incomplete message sets resulting in the security of the system becoming compromised either in terms of integrity or availably. As such, the inventors have recognised that maintaining correct transactional order within blockchains, for example when being used to carry messages in accordance with the messaging aspect described above but also when being used for any other purpose, may be of significant importance in achieving a secure, reliable and fraud-resilient system that utilises one or more DLTs.

Two particular challenges in maintaining correct transactional order in DLTs have been identified by the inventors:
1. If a blockchain forks, one or more transactions that appeared on the shorter prong of the fork may be lost from the blockchain. The skilled person will readily understand the potential for DLTs to fork, and the characteristics of how DLTs behave in that case. However, it is briefly worth noting that traditionally, when transactions are lost by virtue of a fork, they may later be appended into the longer prong of the fork by the network of participating nodes when it has been recognised that transactions have been lost.

Figure 6:
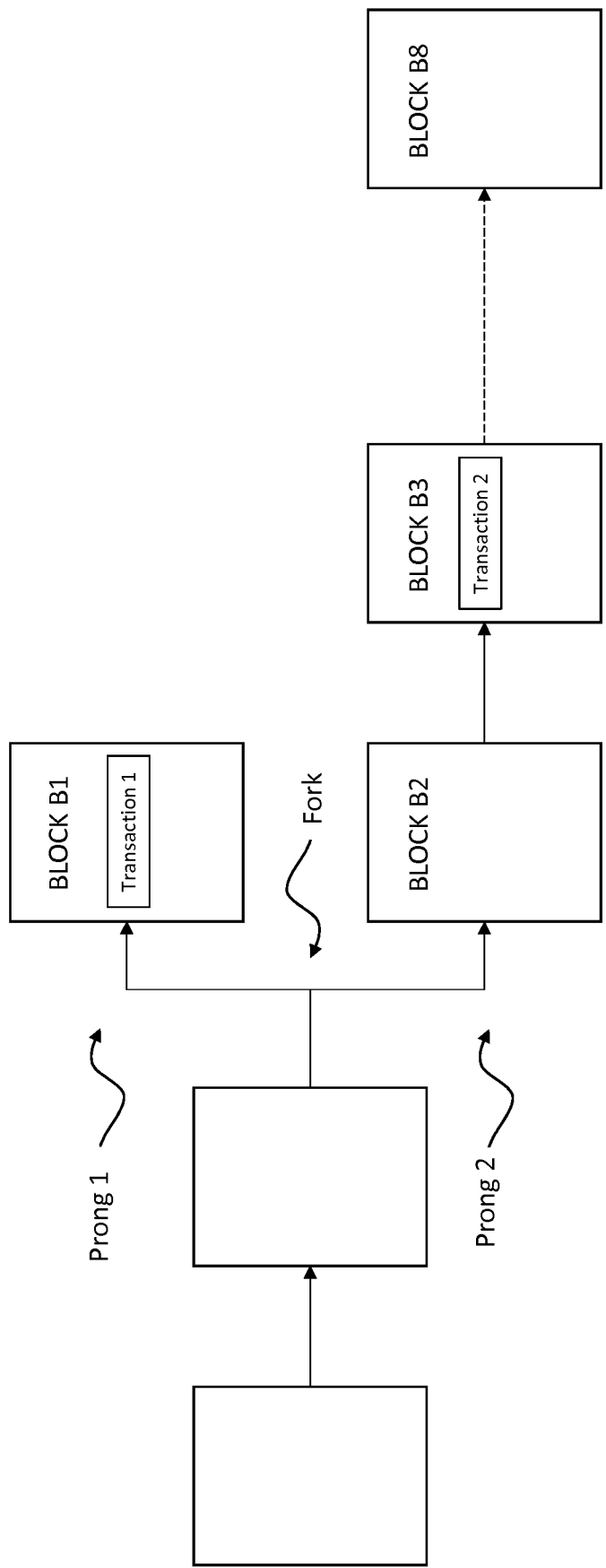
FIG. 6 shows an example representation of a fork in a blockchain.

FIG. 6 shows an example representation of a fork in a block chain. Transaction 1 is part of Block B1 which appears on "Prong 1" of the blockchain. However, as a result of the fork, it has effectively been lost from the blockchain since the blockchain has continued on the longer prong, "Prong 2". Transaction 2 is part of Block B3, which appears on "Prong 2". Sometime later, Transaction 1 is appended to the blockchain as part of Block B8 on "Prong 2". Transaction 1 therefore appears later in the blockchain than Transaction 2. However, if it is important that Transaction 1 precedes Transaction 2 (for example, they relate to consecutive messages), this may cause a security or stability failure, or may allow fraud to take place, in an application that is utilising the blockchain.

2. As explained earlier, in some scenarios, it may be desirable for an application to utilise two or more different DLTs. As part of this, it may sometimes be necessary to perform a cross-ledger transaction (XLT) in order to move data (for example, a message (as described earlier), or a piece of cryptocurrency, or another other type of information stored on a DLT) from one DLT to another. However, whilst each blockchain may be developed to maintain an order between different blocks on the blockchain (for example, using time stamping), it may be very difficult to reliably discern an order between transactions appearing on different blockchains, since each DLT may utilise different time stamping procedures and/or their clocks used for time stamping may be out of sync. Therefore, when utilising two or more (a plurality) of DLTs, determining and maintaining an order of transactions appearing on the DLTs may be very important for the security and stability of an application that is using the DLTs.

Figure 7:
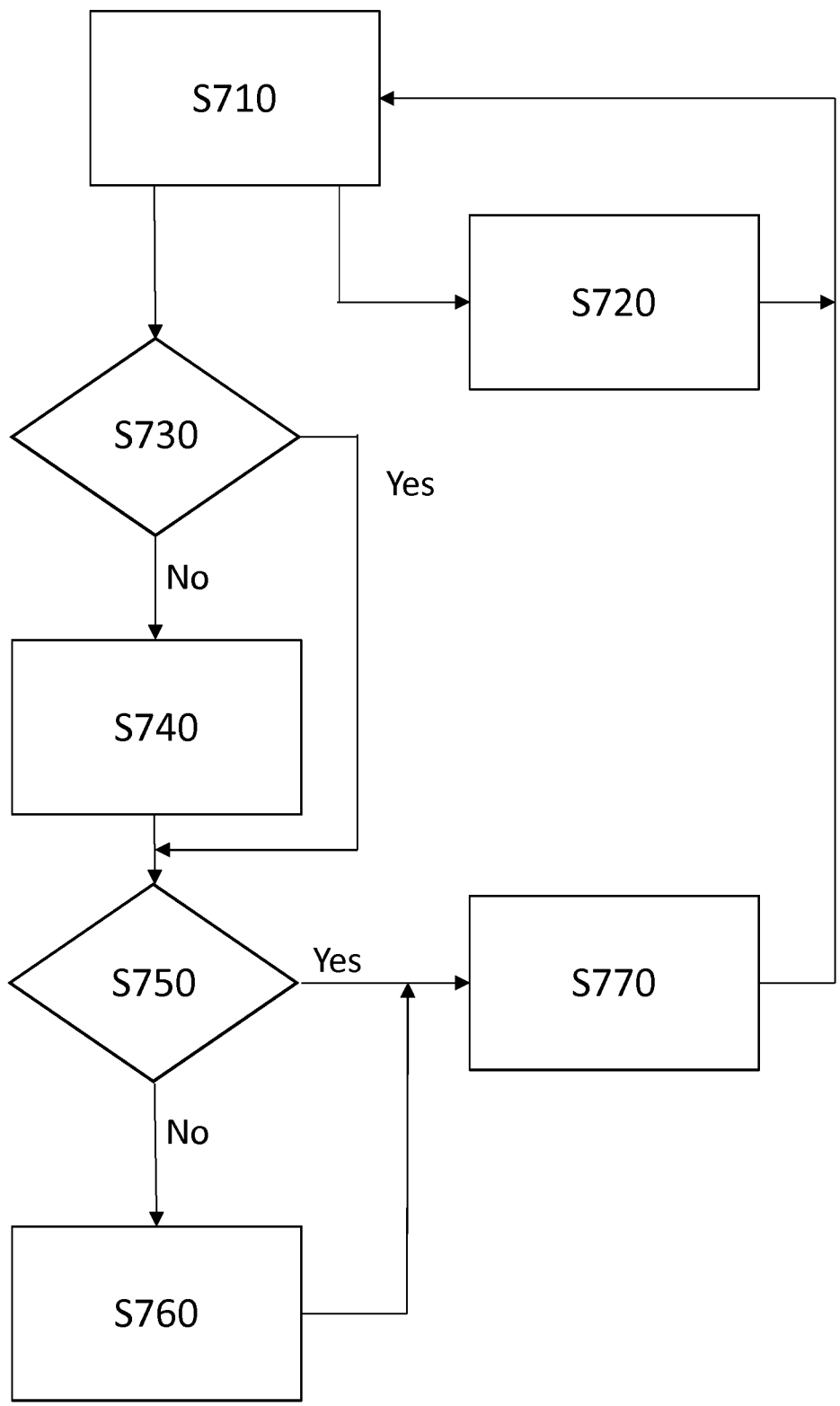
FIG. 7 shows an example representation of a method for maintaining a record of an order of transactions appearing on one or more blockchains in accordance with an aspect of the present disclosure.
Figure 8:
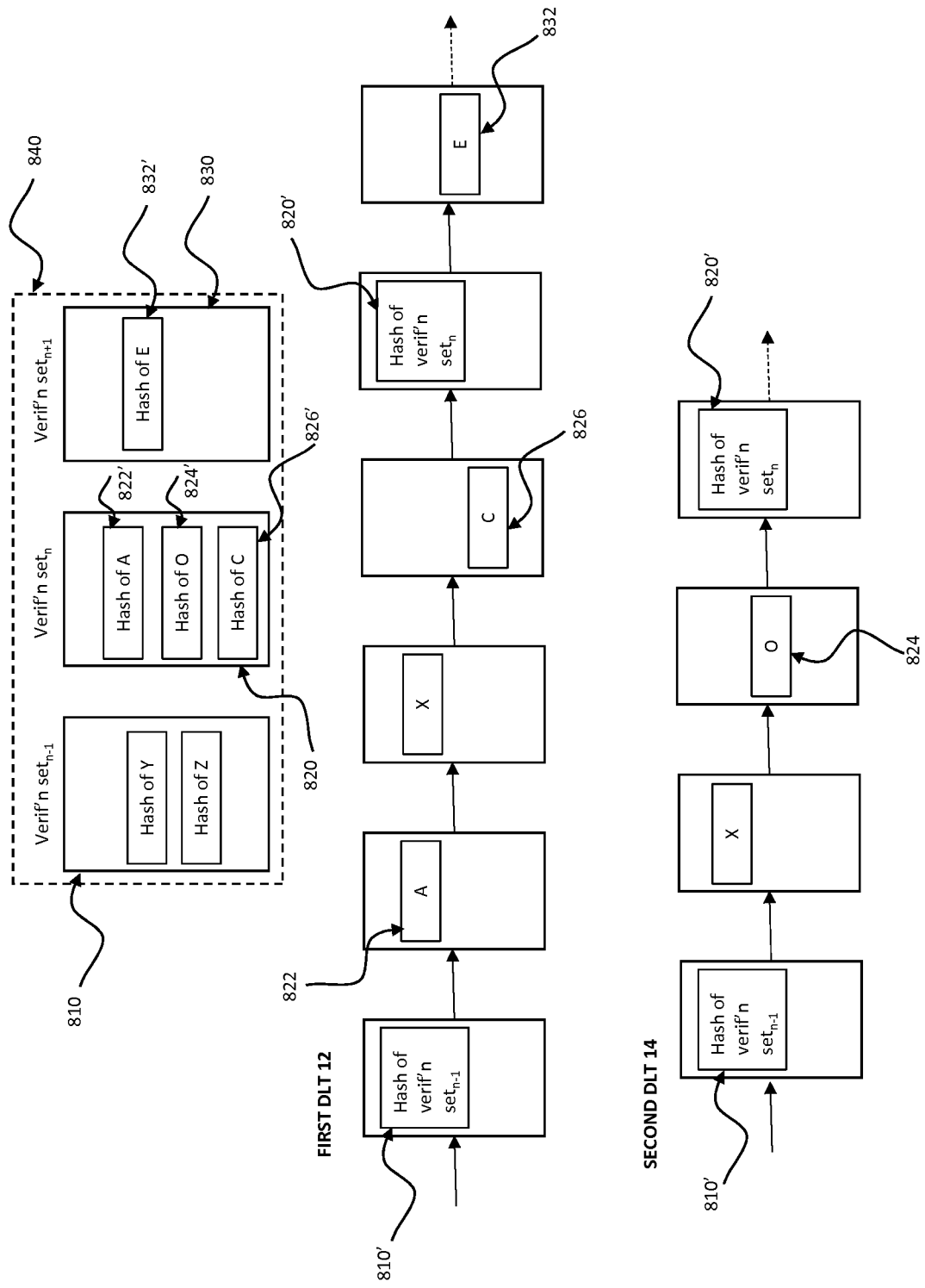
FIG. 8 show an example representation of two blockchains on which the method of FIG. 7 is performed.

FIG. 7 shows example method steps of a process developed by the inventors to maintain transactional order using "verification sets". FIG. 8 shows an example visualisation of two DLTs and verification sets to help in understanding the method steps of FIG. 7.

In Step 710, the first DLT 12 and the second DLT 14 are monitored to identify when a new transaction of interest is included in a block added to the first DLT 12 or the second DLT 14. The first DLT 12 and the second DLT 14 may be monitored by reading the content of each new block when it is added to the DLT. The relevance criteria for what constitutes a transaction of interest is a matter of the particular implementation of this method. For example, the BPI disclosed above may be configured such that any transaction being put on a DLT by utilising the BPI includes some particular identifier that distinguishes it from transactions that have been put on the DLT by any other means (for example, by other entities not utilising the BPI). The particular identifier may be, for example, the public key used for the transaction, or some other type of information within the transaction. Consequently, the relevance criterion may be the identifier included by the BPI, such that any transactions included in the first DLT 12 or the second DLT 14 using the service provided by the service offering developer 310 (for example, transactions added by the first client application 520 or the second client application 530, or indeed by some service application that is operated by the service offering developer to put transactions on the DLTs when necessary) should meet the relevance criterion and may be identified as relevant. This may be particularly useful if the first DLT 12 and/or second DLT 14 are general purpose DLTs that many different entities may utilise, but the service offering developer 310 needs to identify transactions relating to their service in order to ensure proper ordering of those transactions to safeguard the security and stability of their service offering.

In FIG. 8, Transactions A, C, E and O are all transactions of interest. Transactions labelled "Transaction X" are not of interest.

When a new block is added to either the first DLT 12 or the second DLT 14 and it is identified in step 710 that it includes a relevant transaction(s), in Step S720 a transaction identifier (for example, a hash) may be determined for each identified based at least in part on the content of the transaction(s). This identifier is then added to the most recent, or "in progress", verification set. The verification set is part of an off-chain record of relevant transactions that is stored in a data store such as in any suitable memory, database, data-array, cloud storage, etc. The transaction identifier may act as a pointer (for example, a hash pointer) to the relevant transaction in the DLT. Each new transaction identifier is added to the "in progress" verification set in the order in which it was detected. As such, the record of the identified transaction is indicative of the relative order of the transactions, regardless of whether they have appeared in the first DLT 12 or the second DLT 14. As a result, it can be seen that by monitoring both DLTs and adding a transaction identifier for each relevant transaction as soon as they have been added to the first DLT 12 or the second DLT 14, a relative order of transactions may be recorded across one or more different DLTs. The skilled person will recognise that the "in progress" verification set may be stored using any suitable data storage techniques that preserve the ordering of the relevant transactions. Once a new relevant transaction has been added to the "in progress" verification set, the process may return to Step S710 for continued monitoring of the first DLT 12 and the second DLT 14.

At a particular time, the process may proceed to Step S730 to start the process of storing a record (such as a verification set identifier) of the "in progress" verification set (for example, a hash or encryption based at least in part on the content of the "in progress" verification set) to the first DLT 12 and the second DLT 14. The particular time at which the process proceeds to Step S730 is a matter of implementation and may be, for example, after a particular amount of time has been spent monitoring the DLTs since the record of the most recent previous verification set was added to the DLTs, or after a particular number of relevant transactions have been added to the "in progress" verification set, or after a particular number of blocks have been added to the first DLT 12 or the second DLT 14 since the record of the most recent previous verification set was added to the DLTs, etc.

In Step S730, it is determined whether or not a record (for example, a hash or encryption) of the content of the most recent preceding verification set is present on both the first DLT 12 and the second DLT 14 (for example, to check that there has not been a fork in either DLT, causing that record to have been lost). If the record does appear in both DLTs ('Yes' in FIG. 7), the process proceeds to Step S750. If it does not appear in both DLTs, ('No' in FIG. 7), the process proceeds to Step S740. This check may be performed by searching in both of the DLTs for the record of the most recently preceding verification set.

In Step S740, the missing record may be replayed onto the DLT(s) from which it is missing (essentially, the transaction in which the record was first put onto the DLT—for example using the 'messaging aspect' above—is re-broadcast and added to the DLT). However, prior to replaying the missing record, it may first be determined whether or not any of the transactions that were identified within the most recently preceding verification set are also missing from the corresponding DLT on which they should have appeared. This may be quickly determined by using the pointer nature (for example, a hash pointer) of the transaction identifiers in the most recently preceding verification set as stored in the record of the transactions. Any missing transactions may then be replayed onto the relevant DLT prior to the replaying of the missing record of the most recently preceding verification set. Whilst any replayed transaction may now appear later in a DLT than transactions that the missing transaction would have preceded (had it not gone missing), the verification sets will still maintain a proper record of the correct ordering of the transactions. Consequently, missing verification set records, and any missing transactions associated with them, may still be added back onto a DLT, without losing the proper order in which the transactions took place. The details of this step may be more fully appreciated from the discussion of FIGS. 8 and 9 below.

In Step S750, it is determined whether or not all of the transactions identified in the "in progress" verification set still appear in the relevant DLTs (for example, check that none have been lost owing to a fork in one, or both, of the DLTs). If they do all still appear in the relevant DLTs ('Yes' in FIG. 7), the process proceeds to Step S770. If they do not all appear in the relevant DLTs ('No' in FIG. 7), the process proceeds to Step S760. This check may be performed by virtue of the pointer nature of the transition identifiers in the "in progress" verification set.

In Step S760, the transaction(s) identified as now being missing may be replayed onto its corresponding DLT on which it should have appeared (essentially, re-broadcast and added to the DLT). Whilst any replayed transactions may now appear later in a DLT than transactions that the missing transaction would have preceded (had it not gone missing), the "in progress" verification set will still maintain a proper record of the correct ordering of the transactions. Consequently, missing transactions may still be added back onto a DLT, without losing the proper order in which the transactions took place.

In Step S770, a record of the "in progress" verification set is determined based at least in part on the content of the "in progress" verification set (for example, a determination of a verification set identifier such as a hash or an encryption based at least in part on the contents of the verification set) and is added to both the first DLT 12 and the second DLT 14. The record may be added to both DLTs by utilising the techniques described in the 'messaging aspect' above. Consequently, it can be seen that by using the 'messaging aspect' described above, a record of the content of the "in progress" verification set can be added to both DLTs, thereby providing an effectively immutable record of the content of that verification set, using which data integrity, and therefore improved security and reliability, of the record of the relevant transactions may be achieved. The process may then return to Step S710 to continue monitoring the DLTs and begin work on the next "in progress" verification set.

Returning to FIG. 8, we can see a record of the relevant transactions 840 stored in a data store off-chain (which may be any suitable type of data store, or database, or cloud storage or any other type of memory), comprising verification set$_{n-1}$ 810, verification set$_n$ 820 and verification set$_{n+1}$ 830. Verification set$_{n-1}$ 810 comprises a hash of transaction Y and a hash of transaction Z, which are earlier transactions on the first DLT 12 or second DLT 14 and are not otherwise represented in FIG. 8 for the sake of simplicity. Verification set$_n$ 820 comprises a hash of transaction A 822', a hash of transaction O 824' and a hash of transaction C 826'. Transaction A 822 and transaction C 826 appear in the first DLT 12 and transaction O 824 appears in the second DLT 14. The order in which they appear in verification set$_n$ 820 indicates that transaction O 824 was detected after transaction A 822, but before transaction C 826. Verification set$_{n+1}$ 830 comprises a hash of transaction E 832', and may be seen in this example as the "in progress" verification set.

As can be seen, a hash of verification set$_{n-1}$ 810' and a hash of verification set$_n$ 820' have both previously been added to both DLTs, as per Step S770 described above. When verification set$_n$ 820 was the "in progress" verification set, it will be appreciated that when it came to Step S730 described above, the hash of the verification set$_{n-1}$ 810' was present in both DLTs, so the process could proceed straight to Step S750. Likewise, when it came to Step S750, transaction A 822, transaction O 824 and transaction C 826 all still appeared in their relevant DLTs, so the process could then proceed straight to Step S770 to add a hash of the verification set$_n$ 820' to both DLTs.

As a result of this process, it may be seen that an off-chain record of an order of transactions appearing in two blockchains is kept by virtue of the verification sets in the record of the transactions 840. The off-chain record is indicative of a relative order of the transactions to which they relate. By also using the 'messaging aspect' described above to store on both DLTs a hash pointer of each verification set, a record of each verification set may be kept on the DLTs, which may be of particular use in maintaining the data integrity and security of the off-chain record of verification sets, and in the event of a fork in the first DLT 12 and/or second DLT 14, as explained below.

Figure 9:
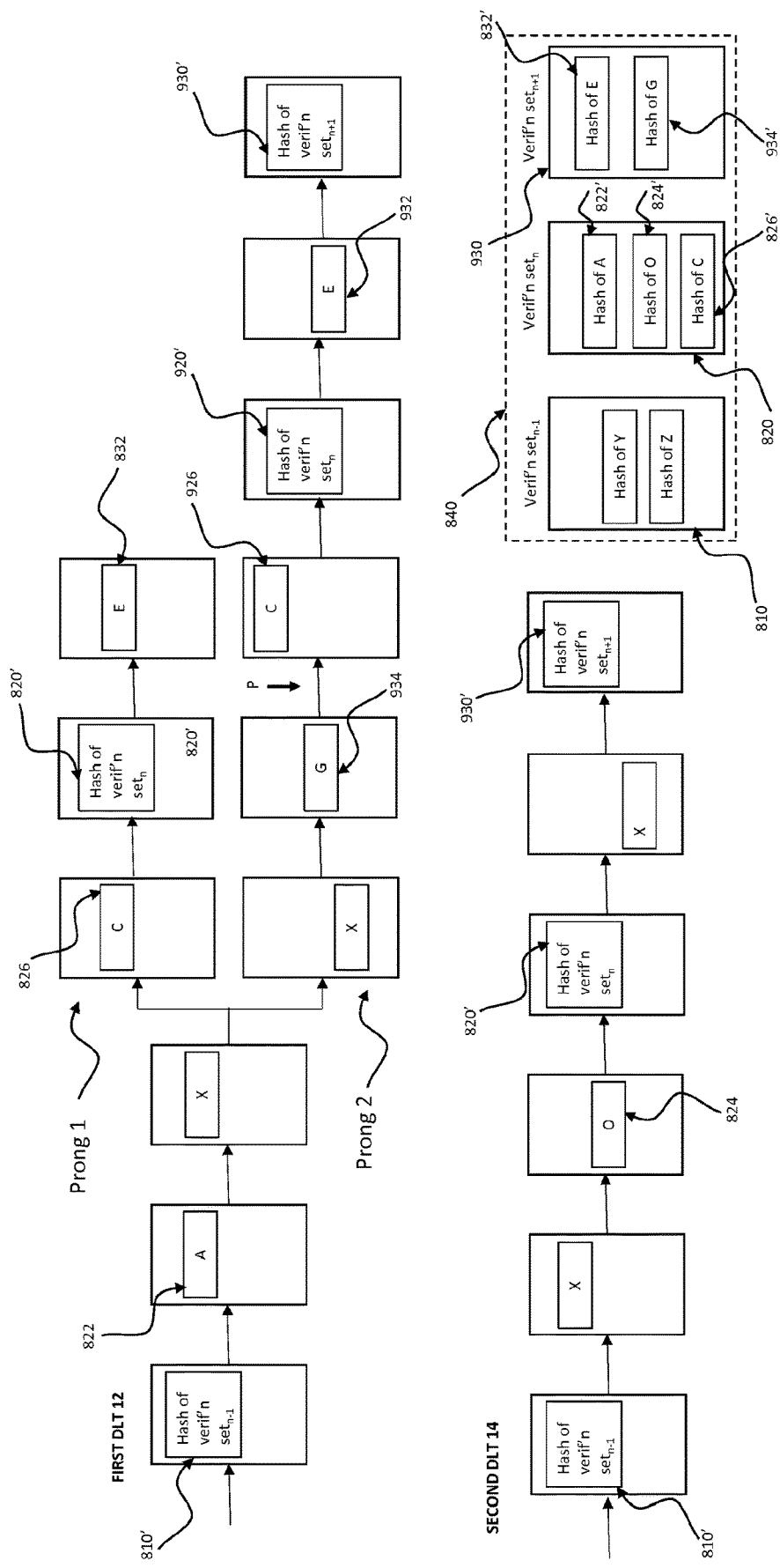
FIG. 9 shows a further example representation of two blockchains on which the method of FIG. 7 is performed.

FIG. 9 shows a further example visualisation of two DLTs and verification sets to help in understanding the method steps of FIG. 7, in particular steps S730 to S760. Whilst FIG. 9 is similar to FIG. 8, FIG. 9 includes a representation of a fork in the first DLT 12, which causes two transactions and a record of a verification set to have been lost from the first DLT 12.

In FIG. 9, the first DLT 12 forks prior to the inclusion of transaction C 826. Transaction C 826, the hash of the verification set$_n$ 820' and the transaction E 832 all appear on "Prong 1" of the fork. However, in this example, it is "Prong 2" of the fork that goes forward as DLT 12 and the contents of "Prong 1" are effectively lost (at least temporarily). Having added the hash of verification set$_n$ 820' to the DLTs, work is commenced on verification set$_{n+1}$ 930, which as can be seen includes a hash of transaction E 832' and a hash of transaction G 934', in that order. At Point P identified in FIG. 9, the process of FIG. 7 goes to Step S730, at which time it is identified that the hash of the verification set$_n$ 820' and transaction C 826 no longer appear in the first DLT 12 (since they both appeared in "Prong 1", which is the prong of the fork that has been lost). As a result, in Step S740, transaction C is replayed (identified by reference numeral 926 in FIG. 9, although it will be appreciated that the content of original transaction C 826 and replayed transaction C 926 will be the same) and then the hash of the verification set$_n$ is replayed (identified by reference numeral 920' in FIG. 9, although it will be appreciated that the original hash of the verification set 820' will be the same as the hash of the replayed verification set 920'). Following that, in Step S750, it is determined that transaction E 832 (which is identified in the "in progress" verification set$_{n+1}$ 930) no longer appears in the first DLT 12 because it was included in "Prong 1". Therefore, in Step S760, transaction E is replayed (identified by reference numeral 932 in FIG. 9, although it will be appreciated that the content of original transaction E 832 and replayed transaction E 932 will be the same). After that, the hash of verification set$_{n+1}$ 930' is added to both DLTs in Step S770. Thus, it can be seen that even though Transaction C 826, the hash of the verification set$_n$ 820' and the transaction E 832 were all lost from the first DLT 12, they may nevertheless be added back onto the first DLT 12 after transaction G 934 (which originally took place after transaction C 826 and transaction E 832) without losing a reliable record of the true order of the transactions, thereby ensuring the security and stability of the system. Consequently, whilst the inclusion of hashes of the verifications sets in the DLTs is optional (in an alternative, the off-chain record of transactions may simply be kept without any hashes of the verification sets stored on the DLTs), it may be appreciated that not only does storing a record of each verification set on the DLTs enable improved security and reliability by virtue of enabling data integrity of the off-chain verification sets, but also it enables forks to be quickly identified and missing records and/or transactions to be added back onto the relevant DLT(s).

It will be appreciated that whilst each block represented in FIG. 9 comprises only a single transaction, in practice it is likely that each block will comprise many transactions. Furthermore, whilst the above describes a process using two DLTs, it will be appreciated that it may be applied to a single DLT, or three or more different DLTs. Furthermore, whilst in the above, "hashes" of the verification sets and transactions are described, it will be appreciated that any suitable verification set identifier determined based at least in part on the content of the verification sets and any suitable transaction identifier based at least in part on the content of the transactions, may alternatively be used.

Furthermore, whilst in the above described process the hashes of the verification sets are added to both DLTs, in an alternative they may be added to only one of the DLTs. That said, it may be preferable to include the hashes of the verification sets on two or more of the DLTs on which the process is operating, since even in the event of a fork, there should then at all times be at least one record of the most recently preceding verification set (it being extremely unlikely that two DLTs would independently fork at the same time, causing them both to lose their hashes of the most recently preceding verification set). This may be useful for data integrity, and therefore security, reasons.

Furthermore, additionally or alternatively to storing in the verification sets hashes of the relevant transactions, a complete copy of the relevant transactions may be stored. However, it may be preferable to store hashes of the relevant transactions, for the sake of data storage efficiency. In one example implementation, hashes of each of the relevant transactions may be stored and a complete copy of recent relevant transactions may be stored (for example, transactions in the most recent one, two, three, four verification sets), which may be useful for replaying missing transactions. By only storing recent relevant transactions, data storage requirements may still be minimised.

Furthermore, identifying and replaying missing transactions is optional, although it may be preferable to perform those steps to ensure that the DLTs are as up-to-date as possible and that the transaction ordering on the DLTs corresponds as closely as possible to the actual transaction ordering as identified in the record of the transaction 840.

Cross Ledger Transaction Aspect

To help even further in understanding the significance of the transaction ordering aspect described above, an example cross ledger transaction (XLT) process utilising the transaction ordering aspect shall now be described.

In this example, it is desired to transfer to the second DLT 14 information that appears in a transaction in the first DLT 12. That information may be anything, for example an amount of cryptocurrency, or a hash message (as described in the 'messaging aspect' above), or any other data. The transaction may be to transfer the information from a first owner to a second owner, or there may be no transfer of ownership at all (for example, an entity may simply wish to store information in a different DLT and effectively remove it from the previous DLT).

Figure 10:
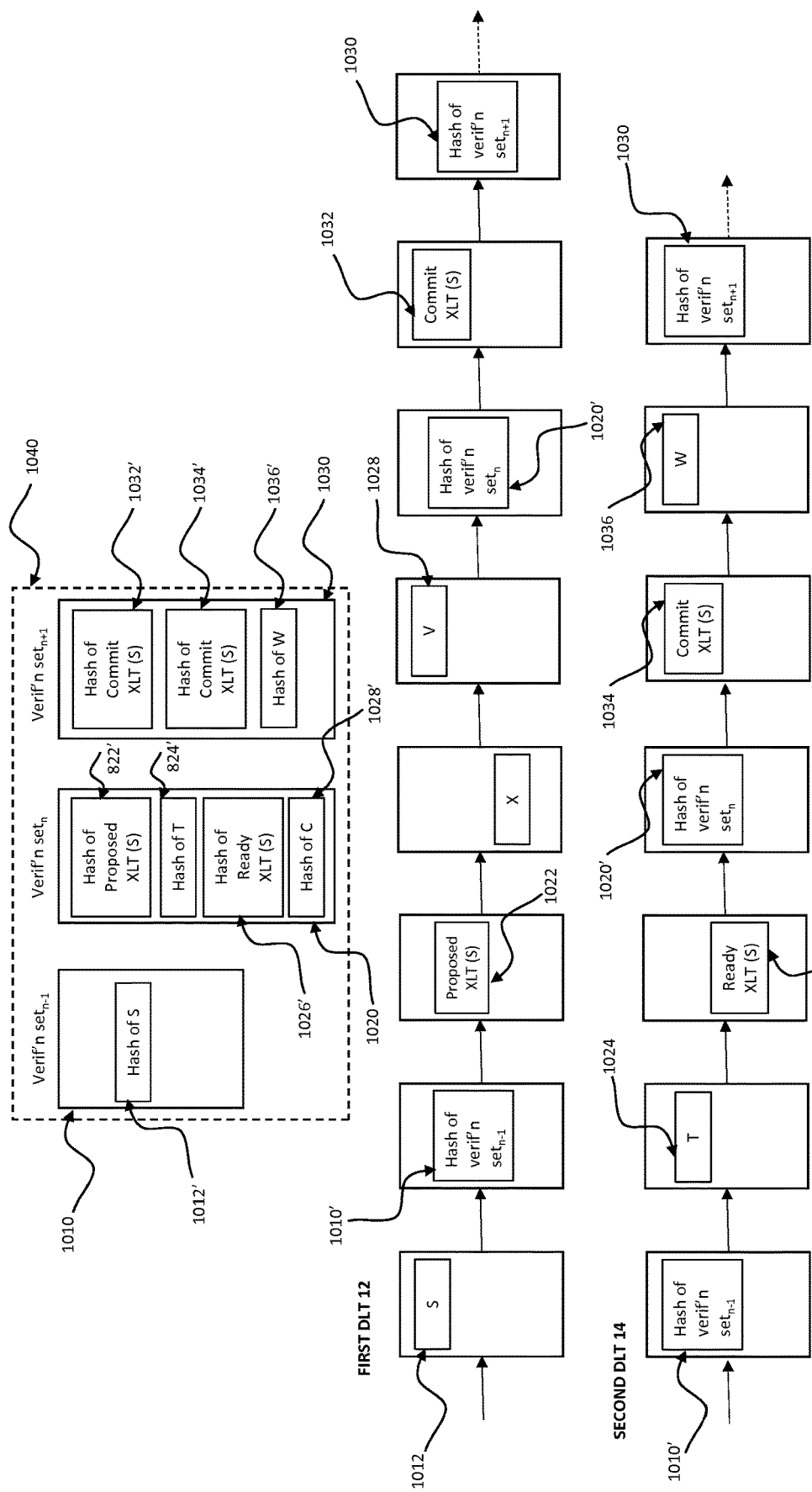
FIG. 10 shows an example representation of two blockchains on which a cross ledger transaction is performed in accordance with an aspect of the present disclosure.

FIG. 10 shows an example visualisation of two DLTs, and corresponding verification sets making up a record of transactions 1040 stored off-chain, in which an XLT is to be performed. Transaction S 1012 comprises the information to be transferred from the first DLT 12 to the second DLT 14. Verification set$_{n-1}$ 1010 comprises a hash of transaction S 1012'. The XLT may be carried out using a two-phase commit process. Two phase commit processes will be well understood by the skilled person, but have nevertheless been briefly described below for the sake of completeness. A proposal for the transfer of the information in transaction S from DLT 12 to DLT 14 is first added to DLT 12 (identified by "proposed XLT (S) 1022" in FIG. 10). This effectively locks transaction S 1012 so that it cannot be used in any other transaction. The intended recipient (which may in some circumstances be the same entity as the current owner of the information to be transferred, as explained earlier) may subsequently indicate in DLT 14 their readiness to accept the transfer (identified by "ready XLT (S) 1026"). In an alternative, in some DLT protocols, readiness may be indicated by replaying "proposed XLT (S) 1022" in the second DLT 14. Once readiness has been indicated on the second DLT 14, the cross ledger transaction may be executed by a commit transaction being added to both of the DLTs (identified by "commit XLT (S) 1032" and "commit XLT (S) 1034" in FIG. 10). As will be well understood by the skilled person, this commitment effectively removes the transacted item from the first DLT 12 and puts it onto the second DLT 14.

For an XLT to be executed securely and reliably, without the risk of fraud or system failure, before the XLT can take place, it may be necessary to ensure that an indication of readiness appears on the second DLT 14 before the commit transaction is put on the two DLTs. Furthermore, it may be preferable for the indication of being ready always to follow the proposal, so that the two can properly be matched up and authenticated. In this way, it can be ensured that the indication of readiness does not in fact relate to some other similar, but different, transaction (for example, relating to an XLT proposal between the same parties, but for the contents of a different earlier transaction on DLT 12). It can also be ensured that the indication of readiness does not fraudulently change some of the details of the XLT.

Previously, as explained earlier, determining the correct order of transactions on different DLTs has been very difficult, particularly in the event of a fork in one or more of the DLTs. Consequently, it has been difficult to carry out XLTs securely and in a straightforward, reliable manner. However, by utilising the transaction ordering aspect described above, the correct order of the relevant transactions may be recorded, even in the event of a fork in one or more of the DLTs.

For example, the transaction ordering aspect may be used to ensure that XLT criteria are met, such as both the proposed XLT (S) 1022 corresponding to the ready XLT (S) 1026 (and optionally both still appearing on the first DLT 12 and the second DLT 14 respectively) and that proposed XLT (S) 1022 precedes ready XLT (S) (even in the event of a fork). In this regard, the commit XLT (S) 1032 transaction may only be added to the DLTs after the XLT criteria have been met. Optionally, the XLT criteria may also comprise a criterion that the hash of the verification set(s) identifying the proposed XLT (S) 1022 and the ready XLT (S) 1026 transactions are present on one or both of the DLTs, which in turn would ensure that both the proposed XLT (S) 1022 and the ready XLT (S) 1026 transactions are present in the respective DLTs. It will be appreciated that whilst in this example the hash of proposed XLT (S) 1022' and the hash of ready XLT (S) 1026' appear in the same verification set, they may alternatively appear in different verification sets. If the hash of proposed XLT (S) 1022' appears in a verification set preceding the verification set in which the hash of ready XLT (S) 1026' appears, then the correct order can be confirmed. If the hash of proposed XLT (S) 1022' appears in a verification set that follows the verification set in which the hash of ready XLT (S) 1026' appears, it can be confirmed that the transactions are in the wrong order, so the XLT should not take place.

As can be seen in FIG. 10, verification set$_n$ 1020 comprises a hash of proposed XLT (S) 1022' and is followed by a hash of ready XLT (S) 1026' (verification set$_n$ 1020 also comprises hashes of other transactions that are deemed relevant, but which are not related to the XLT being discussed here. In practice, an entity that builds the verification sets is likely to identify many relevant transactions in the DLTs and identify them in the verification sets. Some of those relevant transactions may relate to each other, such as transactions relating to a particular XLT, and others will not relate to each other in any way, for example relating to different XLTs, or any other type of DLT transaction that the entity considers to be of relevance). The hash of verification seta 1020' appears in both DLTs and is subsequently followed by commit XLT (S) 1032 on the first DLT 12 and commit XLT (S) 1034 on the second DLT 14 (which are then identified in the next verification set$_{n+1}$ 1030).

Figure 11:
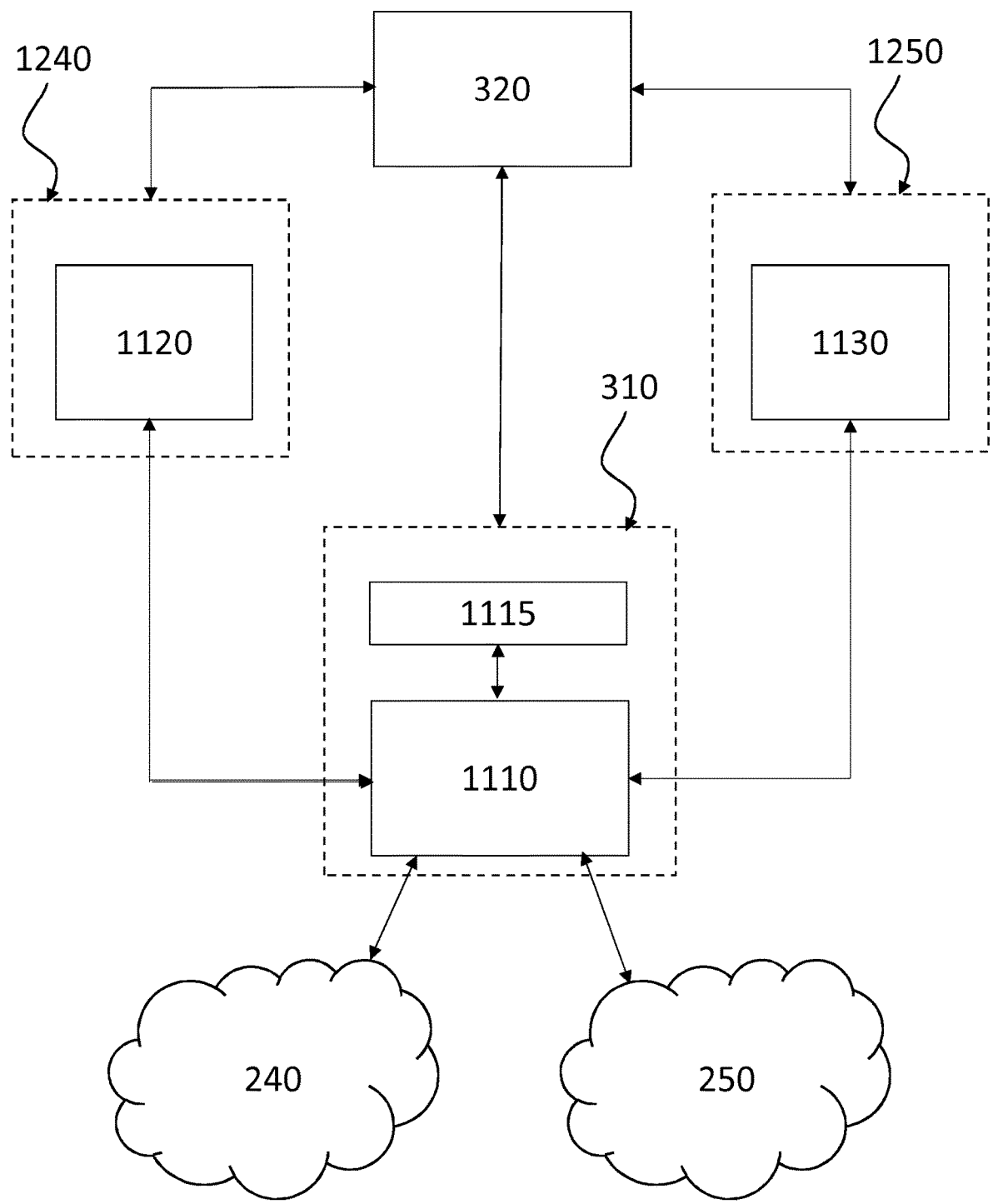
FIG. 11 shows an example representation of a further system in accordance with an aspect of the present disclosure.

XLTs of this type may be implemented in many different ways. FIG. 11 shows an example of one particular implementation, which comprises the service offering developer 310, who in this particular example has developed a service application (or software package/module) 1110 for carrying out XLTs, and has also provided a BPI to the client application developer 320, so they can develop their particular XLT client application (in an alternative, the service offering developer 310 may create the client application for themselves, in which case a BPI may not be offered to any external developers). The first client application 1120 and the second client application 1130 are duplicates of the XLT client application which a first entity 1140 and a second entity 1150 have respectively obtained from the client application developer 320. The client applications in this example may effectively implement the application functional layer 30 and the software package or module 1110 may effectively implement the overledger communications layer 20.

Figure 12:
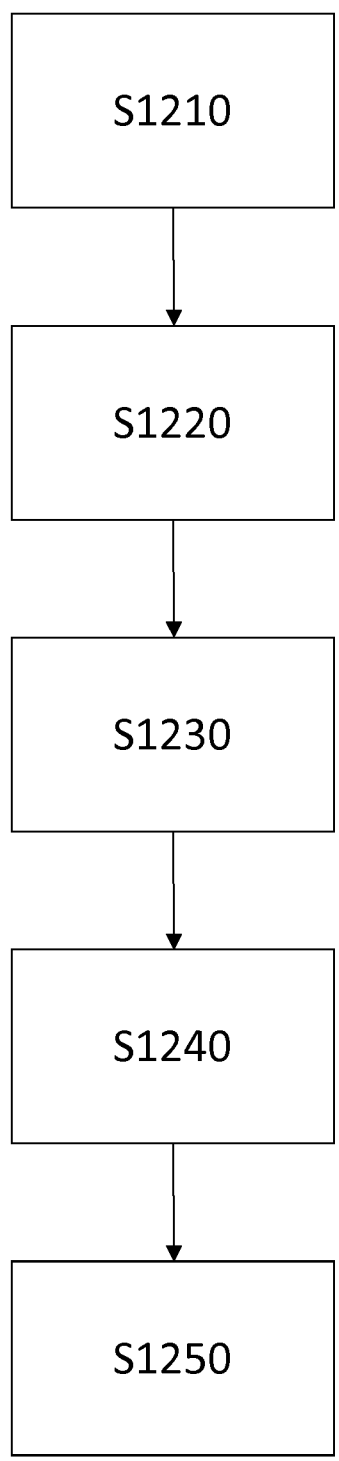
FIG. 12 shows an example representation of a method performed by the system of FIG. 11.

FIG. 12 shows example steps of how an XLT may be carried out by the example system represented in FIG. 11.

In Step S1210, the service application 1110 receives a request from the first client application 1120 to carry out an XLT to transfer an item of information appearing in the first DLT 12 across to the second DLT 14 to transfer ownership to the second entity 1150. As will be appreciated, the request may comprise any necessary information for performing the XLT, as defined in the BPI.

In Step S1220, the service application 1110 may broadcast a proposed XLT transaction to the first DLT network 240, for adding to the first DLT 12.

In Step S1230, the service application 1110 may then broadcast a ready XLT transaction to the second DLT network 250, for adding to the second DLT 14. Optionally, the service application 1110 may have communicated the intention to perform the XLT to the second client application 1130 and then only perform Step S1220 or S1230 after receiving confirmation from the second application 1130 that the transaction should take place.

All the while, the service application 1110 is performing the transaction ordering aspect described above and storing a record of relevant transactions which is indicative of the order of the relevant transactions in a data store 1115.

In Step S1240, the service application 1110 may check the proposed XLT transaction is identified in the stored the record of transaction as having taken place before the corresponding ready XLT transaction, and optionally also that the hash of the relevant verification set(s) has appeared in one or both of the DLTs.

Once this check has been passed, in Step S1250 the service application 1110 broadcasts the commit XLT transaction to the first DLT network 240 and the second DLT network 250 for adding to the first and second DLTs. Optionally, the service application 1110 may notify the first client application 1120 and/or the second client application 1130 of a successful XLT (which may be performed after the commit XLT transaction has appeared on both DLTs, or after the hash of the verification set in which the commit XLT transaction is identified has been included in one or both of the DLTs). In the event that the check is not passed, after a period of time the XLT process may timeout and the first client application 1120 and/or the second client application 1130 may be notified of a failure.

Therefore, it can be seen that by performing the ordering aspect described above, and then only posting the commit transaction to the DLTs after the proposed XLT transaction and corresponding ready XLT transaction have been verified as taking place in the correct order in the verification sets, the service application 1110 may ensure that the XLT is carried out securely and stably.

It will be appreciated that this is merely one particular, non-limiting example. In an alternative the first client application 1120 may itself broadcast the proposed XLT transaction to the first DLT network 240 and/or the second client application 1130 may itself broadcast the ready XLT transaction to the second DLT network 250, depending on the particular BPI offered by the service offering developer 310 and/or the implementation of the client application offered by the client application developer 320. In this case, the service application 1110 may simply perform the transaction ordering aspect described above and then carry out Steps S1140 and S1150 when it has identified a proposed XLT transaction and corresponding ready XLT transaction in the relevant DLTs. Furthermore, the XLT may involve only one entity, since they may simply be moving their information from one DLT to another DLT, with any change in ownership.

It will be appreciated that the overledger SDK may comprise the rules and methods for carrying out the transaction ordering aspect and optionally also the XLT aspect. As such, the overledger SDK offers the tools by which the service offering developer 310 may implement any service applications/modules that utilise the transaction ordering aspect (and optionally also the XLT aspect) on any DLTs of their choosing that are supported by the overledger SDK.

They may then create a corresponding BPI of their choosing, to allow any suitable functionality of the service offering to be utilised by client application developers 320, such that interactions with DLTs in performing the ordering aspect may be performed by the overledger communications layer 20 and be decoupled from any application functional layer 30 operations on the client applications. Consequently, the client applications may utilise the security and stability benefits afforded by the transaction ordering aspect, whilst still being decoupled from interacting with the DLTs directly.

As a result, it can be seen that by offering an overledger SDK that includes the rules and methods for carrying out the transaction ordering aspect, there is huge flexibility and opportunity for the technical benefits of the transaction ordering aspect to be utilised by a wide variety of different entities, in different ways, whilst still decoupling blockchain interactions from the application functional layer 30.

The skilled person will readily appreciate that various alterations or modifications may be made to the above described aspects of the disclosure without departing from the scope of the disclosure.

Whilst all of the interfaces represented by arrows in FIGS. 2, 3, 5 and 11 show direct connections between each of the different entities and modules, it will be appreciated that there may be any number of intermediate entities or modules as part of those interfaces, for example communications routers, etc. Furthermore, each of the interfaces may carry data/communications between each of the entities and modules in accordance with any suitable communications architecture and protocols.

The aspects of the present disclosure described in all of the above may be implemented by software, hardware or a combination of software and hardware. For example, the transaction ordering aspect and/or XLT aspect and/or over ledger messaging layer may be implemented by software comprising computer readable code, which when executed on one or more processors (such as one or more microprocessors, or programmable logic) of any electronic device (for example, any standard computing device, such as a server, or desktop computer, or laptop computer, etc), performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way.

What is claimed is:

1. A computer implemented method for effecting a communications layer that maintains a record of an order of messages appearing on two or more distributed ledgers, the method comprising:
   identifying a plurality of messages, wherein each of the messages in the plurality of messages is recorded on at least one of the two or more distributed ledgers, wherein the transaction confirmation timings for each of the two or more distributed ledgers are unsynchronized;
   determining a message identifier for each identified message based at least in part on content of the corresponding identified message; and
   storing the message identifiers in a data store that is separate from the two or more distributed ledgers as a record of the plurality of messages, wherein the record includes order data indicative of the relative order of the plurality of messages and includes a pointer to each of the messages on a corresponding distributed ledger of the two or more distributed ledgers, and wherein the record of the plurality of messages comprises a plurality of consecutive verification sets, and wherein at least some of the plurality of consecutive verification sets comprise one or more of the message identifiers corresponding to a respective one or more of the plurality of messages;
   storing, on at least one of the two or more distributed ledgers, a record of the most recent verification set of the plurality of consecutive verification sets, whereby the record of the plurality of messages can be used to provide at least one of increased security of one or more of the two or more distributed ledgers and/or interoperability between applications and one or more of the two or more distributed ledgers;
   checking that a record of the preceding verification set in the plurality of verification sets is present on the at least one of the two or more distributed ledgers, and if a record of the preceding verification set is not present on the at least one of the two or more distributed ledgers:
   replaying a record of the preceding verification set onto the at least one of the two or more distributed ledgers.

2. The method of claim 1, wherein identifying the plurality of messages comprises:
   reading the content of each new block added to each of the two or more distributed ledgers.

3. The method of claim 2, wherein identifying the plurality of messages further comprises:
   comparing the messages in each new block against a relevance criterion and selecting messages that meet the relevance criterion.

4. The method of claim 3, wherein storing the record of the plurality of messages in the data store comprises, each time a message is identified in a new block, storing a record of that identified message in the data store, wherein the order data is based on the relative order in which each of the plurality of messages was identified.

5. The method of claim 1, further comprising:
   if a record of the preceding verification set is not present on the at least one of the two or more distributed ledgers:
   checking that each of the messages identified in the preceding verification set is present on its corresponding distributed ledger of the two or more distributed ledgers, and
   if one or more of the messages identified in the preceding verification block are not present on their corresponding distributed ledger of the two or more distributed ledgers:
   replaying the one or more messages onto their corresponding distributed ledgers.

6. The method of claim 5, further comprising:
   checking that each of the messages identified in the most recent verification set is present on the at least one of the two or more distributed ledgers, and
   if one or more of the messages identified in the preceding verification block are not present on their corresponding distributed ledger of the two or more distributed ledgers:
   replaying the one or more messages onto their corresponding distributed ledgers.

7. The method of claim 6, wherein the record of the most recent verification set comprises a verification set identifier that is determined based at least in part on the contents of the most recent verification set.

8. The method of claim 7, wherein the verification set identifier of the most recent verification set comprises a hash of the contents of the most recent verification set.

9. The method of claim 1, wherein the record of the plurality of messages comprises a plurality of the message identifiers.

10. A computer architecture for effecting a communications layer that maintains a record of an order of messages appearing on two or more distributed ledgers, the architecture comprising:
at least one computer processor; and
at least one memory device storing instructions which, when executed by the at least one computer processor, cause the at least one computer processor to:
identify a plurality of messages, wherein each of the messages in the plurality of messages is recorded on at least one of the two or more distributed ledgers, wherein the transaction confirmation timings for each of the two or more distributed ledgers are unsynchronized;
determine a message identifier for each identified message based at least in part on content of the corresponding identified message; and
cause the message identifiers to be stored in a data store that is separate from the two or more distributed ledgers as a record of the plurality of messages, wherein the record includes order data indicative of the relative order of the plurality of messages and includes a pointer to each of the messages on a corresponding distributed ledger of the two or more distributed ledgers, wherein the record of the plurality of messages comprises a plurality of consecutive verification sets, and wherein at least some of the plurality of consecutive verification sets comprise one or more of the message identifiers corresponding to a respective one or more of the plurality of messages;
cause a record of the most recent verification set of the plurality of consecutive verification sets to be stored on at least one of the two or more distributed ledgers, whereby the record of the plurality of messages can be used to provide at least one of increased security of one or more of the two or more distributed ledgers and/or interoperability between applications and one or more of the two or more distributed ledgers;
check that a record of the preceding verification set in the plurality of verification sets is present on the at least one of the two or more distributed ledgers, and if a record of the preceding verification set is not present on the at least one of the two or more distributed ledgers:
cause a record of the preceding verification set to be replayed onto the at least one of the two or more distributed ledgers.

11. The architecture of claim 10, wherein identifying the plurality of messages comprises:
reading the content of each new block added to each of the two or more distributed ledgers.

12. The architecture of claim 11, wherein identifying the plurality of messages further comprises:
comparing the messages in each new block against a relevance criterion and selecting messages that meet the relevance criterion.

13. The architecture of claim 12, wherein storing the record of the plurality of messages in the data store comprises, each time a message is identified in a new block, storing a record of that identified message in the data store, wherein the order data is based on the relative order in which each of the plurality of messages was identified.

14. The architecture of claim 10, wherein:
the record of the plurality of messages comprises a plurality of consecutive verification sets, and wherein
at least some of the plurality of consecutive verification sets comprise one or more of the message identifiers corresponding to a respective one or more of the plurality of messages.

15. The architecture of claim 14, wherein the instructions further cause the at least one processor to:
cause a record of the most recent verification set of the plurality of consecutive verification sets to be stored on at least one of the two or more distributed ledgers.

16. Non-transient computer readable media having instructions stored thereon which, when executed by at least one computer processor, cause the at least one computer processor to:
identify a plurality of messages, wherein each of the messages in the plurality of messages is recorded on at least one of two or more distributed ledgers, wherein the transaction confirmation timings for each of the two or more distributed ledgers are unsynchronized;
determine a message identifier for each identified message based at least in part on content of the corresponding identified message; and
cause the message identifiers to be stored in a data store that is separate from the two or more distributed ledgers as a record of the plurality of messages,
wherein the record includes order data indicative of the relative order of the plurality of messages and includes a pointer to each of the messages on a corresponding distributed ledger of the two or more distributed ledgers, and
wherein the record of the plurality of messages comprises a plurality of consecutive verification sets, and wherein at least some of the plurality of consecutive verification sets comprise one or more of the message identifiers corresponding to a respective one or more of the plurality of messages;
cause a record of the most recent verification set of the plurality of consecutive verification sets to be stored on at least one of the two or more distributed ledgers, whereby the record of the plurality of messages can be used to provide at least one of increased security of the one or more distributed ledgers and/or interoperability between applications and the one or more distributed ledger;
check that a record of the preceding verification set in the plurality of verification sets is present on the at least one of the two or more distributed ledgers, and
if a record of the preceding verification set is not present on the at least one of the two or more distributed ledgers:
cause a record of the preceding verification set to be replayed onto the at least one of the two or more distributed ledgers.

* * * * *

UNITED STATES PATENT AND TRADEMARK OFFICE
CERTIFICATE OF CORRECTION

| | |
|---|---|
| PATENT NO. | : 11,842,335 B2 |
| APPLICATION NO. | : 16/768097 |
| DATED | : December 12, 2023 |
| INVENTOR(S) | : Gilbert Verdian et al. |

It is certified that error appears in the above-identified patent and that said Letters Patent is hereby corrected as shown below:

In the Claims

Claim 6 should read:
6. The method of claim 5, further comprising:
    checking that each of the messages identified in the most recent verification set is present on the at least one of the two or more distributed ledgers, and
    if one or more of the messages identified in the most recent verification set are not present on their corresponding distributed ledger of the two or more distributed ledgers:
    replaying the one or more messages onto their corresponding distributed ledgers.

Signed and Sealed this
Twenty-seventh Day of February, 2024

Katherine Kelly Vidal
*Director of the United States Patent and Trademark Office*